(12) United States Patent
Uchida et al.

(10) Patent No.: US 12,270,976 B2
(45) Date of Patent: Apr. 8, 2025

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Tsuneo Uchida, Chiba (JP); Katsu Yamada, Osaka (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 759 days.

(21) Appl. No.: 17/511,799

(22) Filed: Oct. 27, 2021

(65) Prior Publication Data

US 2022/0082805 A1 Mar. 17, 2022

Related U.S. Application Data

(63) Continuation of application No. PCT/JP2019/049166, filed on Dec. 16, 2019.

(30) Foreign Application Priority Data

May 29, 2019 (JP) ................. 2019-100454

(51) Int. Cl.
*G02B 13/16* (2006.01)
*G03B 17/17* (2021.01)
*G03B 21/28* (2006.01)

(52) U.S. Cl.
CPC ............. *G02B 13/16* (2013.01); *G03B 17/17* (2013.01); *G03B 21/28* (2013.01)

(58) Field of Classification Search
CPC ......... G02B 13/16; G03B 17/17; G03B 21/28
(Continued)

(56) References Cited

U.S. PATENT DOCUMENTS

| 6,124,986 A | 9/2000 | Sekita et al. |
| 6,396,639 B1 | 5/2002 | Togino et al. |

(Continued)

FOREIGN PATENT DOCUMENTS

| CN | 1591082 | 3/2005 |
| JP | 10-20196 | 1/1998 |

(Continued)

OTHER PUBLICATIONS

Notice of Reasons for Refusal issued Feb. 14, 2023 in corresponding Japanese Patent Application No. 2019-100454, with English language translation.

(Continued)

*Primary Examiner* — Stephone B Allen
*Assistant Examiner* — Boutsikaris Leonidas
(74) *Attorney, Agent, or Firm* — Wenderoth, Lind & Ponack, L.L.P.

(57) ABSTRACT

An optical system according to the present disclosure includes a first sub-optical system including an aperture stop and a second sub-optical system including a prism. The prism has a first transmission surface located on the reduction side, a second transmission surface located on the magnification side, and at least one reflection surface located on the optical path between the first transmission surface and the second transmission surface. A first reflection surface closest to the intermediate imaging position has a shape with a concave surface facing a direction into which a light ray incident on first the reflection surface is reflected. A curvature shape of the first reflection surface is set such that some of multiple principal rays passing through the reduction conjugate point intersect on the optical path between the first reflection surface and the second transmission surface.

20 Claims, 13 Drawing Sheets

(58) Field of Classification Search
USPC .......................................................... 359/737
See application file for complete search history.

(56) References Cited

U.S. PATENT DOCUMENTS

| | | | |
|---|---|---|---|
| 2003/0007255 | A1 | 1/2003 | Akiyama et al. |
| 2008/0013191 | A1 | 1/2008 | Togino et al. |
| 2008/0151380 | A1 | 6/2008 | Togino |
| 2010/0238568 | A1 | 9/2010 | Togino et al. |
| 2013/0182317 | A1* | 7/2013 | Takahashi .......... G02B 27/0101 359/365 |
| 2019/0154885 | A1 | 5/2019 | Steever et al. |
| 2020/0033574 | A1 | 1/2020 | Morikuni |
| 2020/0033715 | A1* | 1/2020 | Morikuni ............... G02B 13/16 |
| 2020/0150516 | A1 | 5/2020 | Uchida et al. |
| 2020/0166737 | A1* | 5/2020 | Amano ............. G02B 17/0816 |
| 2020/0278595 | A1 | 9/2020 | Yanagisawa et al. |
| 2020/0278600 | A1 | 9/2020 | Yanagisawa et al. |
| 2020/0278601 | A1* | 9/2020 | Yanagisawa ....... G02B 17/0856 |
| 2021/0033829 | A1 | 2/2021 | Ishigame |
| 2021/0291658 | A1* | 9/2021 | Hirata ...................... H04N 5/74 |

FOREIGN PATENT DOCUMENTS

| | | |
|---|---|---|
| JP | 10-68886 | 3/1998 |
| JP | 2003-84200 | 3/2003 |
| JP | 2006-276816 | 10/2006 |
| JP | 2006-285002 | 10/2006 |
| JP | 2006-330353 | 12/2006 |
| JP | 2007-328232 | 12/2007 |
| JP | 2007-334019 | 12/2007 |
| JP | 6390882 | 9/2018 |
| JP | 2019-133061 | 8/2019 |
| JP | 2020-20860 | 2/2020 |
| JP | 2020-24377 | 2/2020 |
| JP | 2020-42103 | 3/2020 |
| JP | 2020-140153 | 9/2020 |
| JP | 2020-140154 | 9/2020 |
| JP | 2020-140155 | 9/2020 |
| WO | 2019/151252 | 8/2019 |

OTHER PUBLICATIONS

First Office Action issued Sep. 12, 2023 in corresponding Chinese Patent Application No. 201980096237.5, with English language translation.

Office Action issued May 7, 2024 in Japanese Patent Application No. 2023-132519, with English-language Translation.

Second Office Action issued Feb. 7, 2024 in corresponding Chinese Patent Application No. 201980096237.5, with English machine translation.

Notice of Reasons for Refusal issued Oct. 25, 2022 in corresponding Japanese Patent Application No. 2019-100454, with English translation.

International Preliminary Report on Patentability (Chapter II) dated Dec. 2, 2021 in International (PCT) Application No. PCT/JP2019/049166.

International Search Report issued Mar. 17, 2020 in International (PCT) Application No. PCT/JP2019/049166.

* cited by examiner

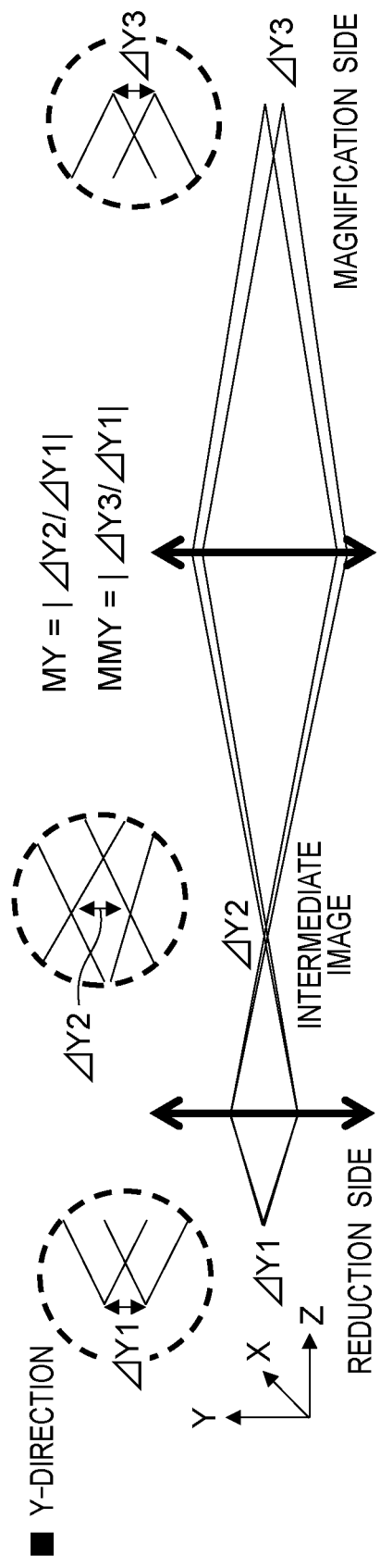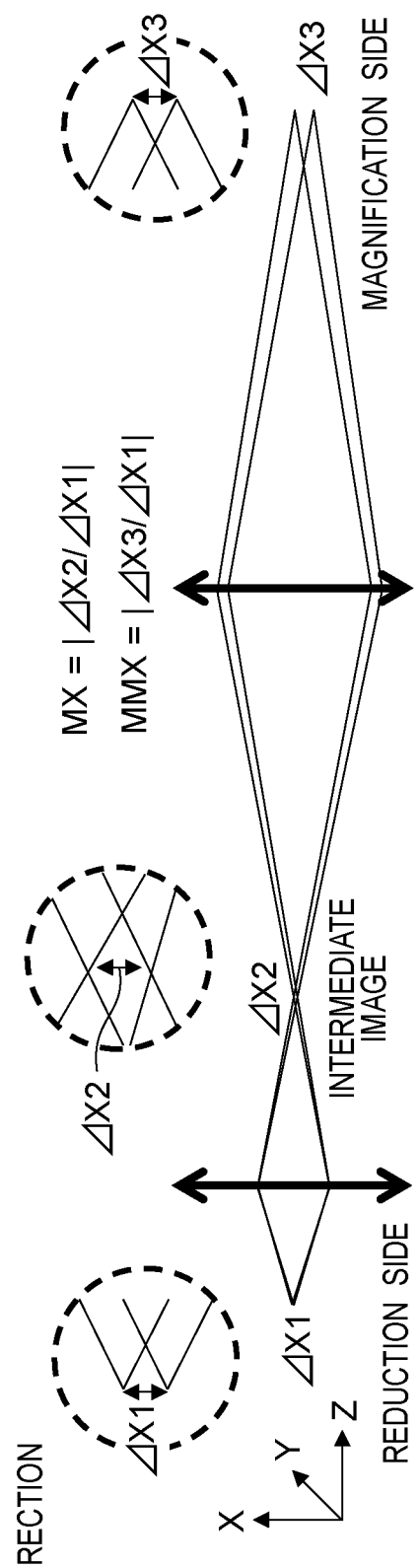

EXAMPLE 1

EXAMPLE 2

EXAMPLE 3

EXAMPLE 4

OPTICAL SYSTEM, IMAGE PROJECTION APPARATUS, AND IMAGING APPARATUS

CROSS-REFERENCE OF RELATED APPLICATIONS

This application is a continuation of International Patent Application No. PCT/JP2019/049166, filed on Dec. 16, 2019, which claims the benefit of Japanese Patent Application No. 2019-100454, filed on May 29, 2019, the contents all of which are incorporated herein by reference.

TECHNICAL FIELD

The present disclosure relates to an optical system using a prism. The present disclosure also relates to an image projection apparatus and an imaging apparatus using such an optical system.

BACKGROUND

Patent Document 1 discloses a zooming optical system which includes an off-axial optical element located eccentrically, thereby bending the optical path inside the zooming optical system so as to have a desired shape and shortening the total length of the zooming optical system.

Patent Document 2 discloses an imaging optical system which includes a plurality of eccentric prisms. More specifically, two eccentric prisms each having a rotationally asymmetric reflection surface are located on the both sides of a stop, and the medium of the eccentric prism 10 before the stop and the medium of the eccentric prism 20 after the stop are different in optical property from each other.

PATENT DOCUMENT

[Patent Document 1] JP H10-20196 A
[Patent Document 2] JP 2003-84200 A
[Patent Document 3] JP 6390882 B

SUMMARY

The present disclosure provides an optical system which can realize projection or imaging with a shorter focal length and a larger-sized screen using a small-sized prism. The present disclosure also provides an image projection apparatus and an imaging apparatus using such an optical system.

One aspect of the present disclosure is directed to an optical system having a reduction conjugation point on a reduction side and a magnification conjugation point on a magnification side and internally having an intermediate imaging position that is conjugated to both the reduction conjugation point and the magnification conjugation point. The reduction conjugate point has an image-forming relationship in a rectangular region having a longitudinal direction and a lateral direction. The optical system includes a first sub-optical system including an aperture stop defining a range in which a light flux can pass through the optical system and a second sub-optical system disposed on the magnification side of the first sub-optical system and including a prism made of a transparent medium. The prism has a first transmission surface located on the reduction side, a second transmission surface located on the magnification side, and at least one reflection surface located on an optical path between the first transmission surface and the second transmission surface. The aperture stop is positioned between the reduction conjugate point and the intermediate imaging position. A portion or whole of intermediate images formed at the intermediate imaging position are positioned inside the medium of the prism. A first reflection surface closest to the intermediate imaging position has a shape with a concave surface facing a direction into which a light ray incident on the first reflection surface is reflected. The second transmission surface has a shape with a convex surface facing the magnification side. In case an X-direction, a Y-direction, and a Z-direction are a longitudinal direction, a lateral direction, and a normal direction, respectively, of the rectangular region of the reduction conjugate point, when a Y cross-section is a plane including a position where a principal ray passing through the center in the X-direction is reflected by the first reflection surface, and an X cross-section is a cross-section perpendicular to the Y cross-section, a curvature shape of the first reflection surface may be set such that some of multiple principal rays passing through the reduction conjugate point intersect on the optical path between the first reflection surface and the second transmission surface as viewed in a direction perpendicular to the Y cross-section while some of multiple principal rays passing through the reduction conjugate point intersect on the optical path between the first reflection surface and the second transmission surface as viewed in a direction perpendicular to the X cross-section.

Further, an image projection apparatus according to another aspect of the present disclosure includes the above-described optical system and an image forming element that generates an image to be projected through the optical system onto a screen.

Still further, an imaging apparatus according to another aspect of the present disclosure includes the above-described optical system and an imaging element that receives an optical image formed by the optical system to convert the optical image into an electrical image signal.

In the optical system according to the present disclosure, multiple principal rays intersect on the optical path between the first reflection surface and the second transmission surface of the prism for both the Y cross-section and the X cross-section. Therefore, projection or imaging with a shorter focal length and a larger-sized screen can be realized by using a small-sized prism.

BRIEF DESCRIPTION OF THE DRAWINGS

FIG. 19 is an explanatory diagram showing definitions of imaging magnification ratios at an intermediate imaging position and imaging magnification ratios at an magnification conjugate point.

DESCRIPTION OF EMBODIMENT

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image SA obtained by spatially modulating incident light using an image forming element, such as liquid crystal or digital micromirror device (DMD), based on an image signal. In other words, the optical system according to the present disclosure can be used for magnifying the original image SA on the image forming element arranged on the reduction side to project the image onto the screen (not shown), which is arranged on an extension line on the magnification side. However, a projection surface is not limited to the screen. Examples of the projection surface includes walls, ceilings, floors, windows, etc. in houses, stores, or vehicles and airplanes used as means for transportation.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, an optical system according to a first embodiment of the present disclosure will be described with reference to FIGS. 1 to 20.

Example 1

Figure 1:
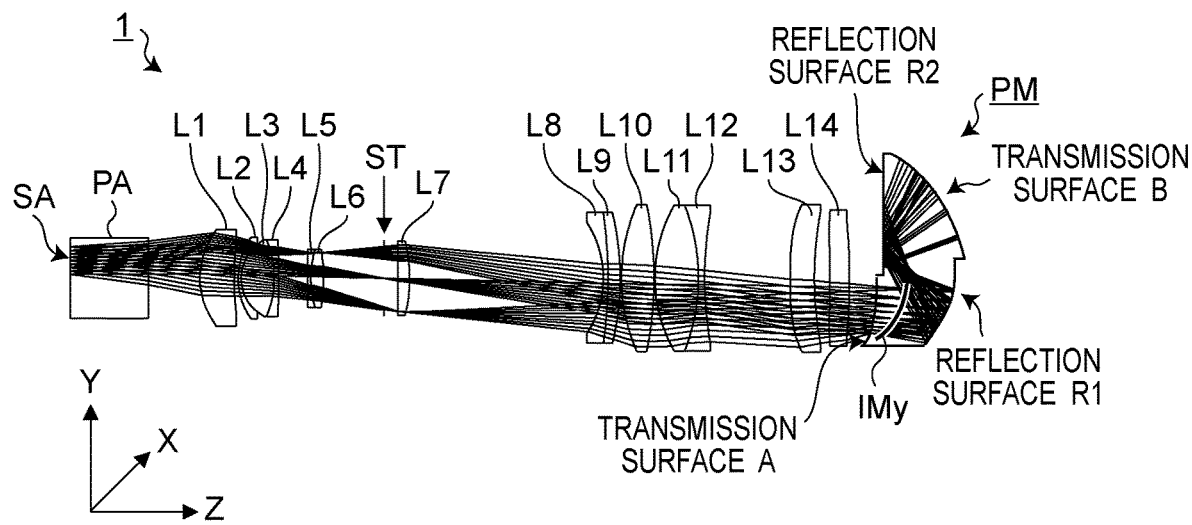
FIG. 1 is an arrangement diagram showing an optical system according to an example 1.

FIG. 1 is an arrangement diagram showing an optical system 1 according to an example 1. The optical system 1 includes a first sub-optical system including an aperture stop ST and a second sub-optical system including a prism PM. In FIG. 1, a reduction conjugate point, which is an imaging position on the reduction side, is located on the left side, and a magnification conjugate point, which is an imaging position on the magnification side, is located on the right side. The second sub-optical system is disposed on the magnification side of the first sub-optical system.

Figure 18:
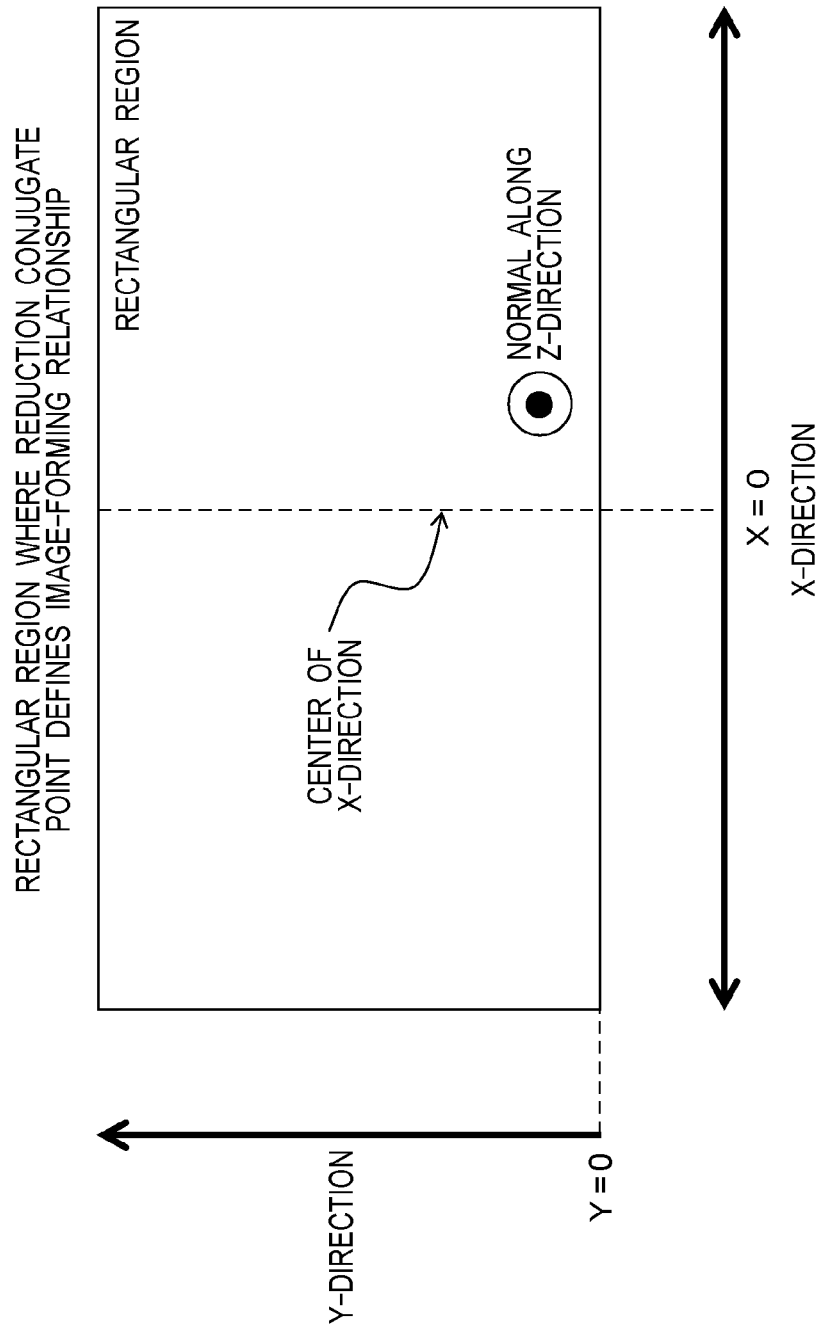
FIG. 18 is an explanatory diagram showing an example of an image region at a reduction conjugate point.
Figure 20A:
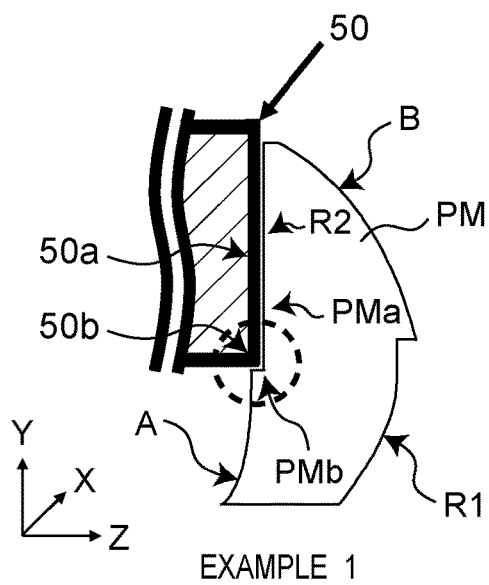
FIGS. 20A to 20D are Y-directional cross-sectional views showing various examples of a stepped structure of the prism.
Figure 20B:
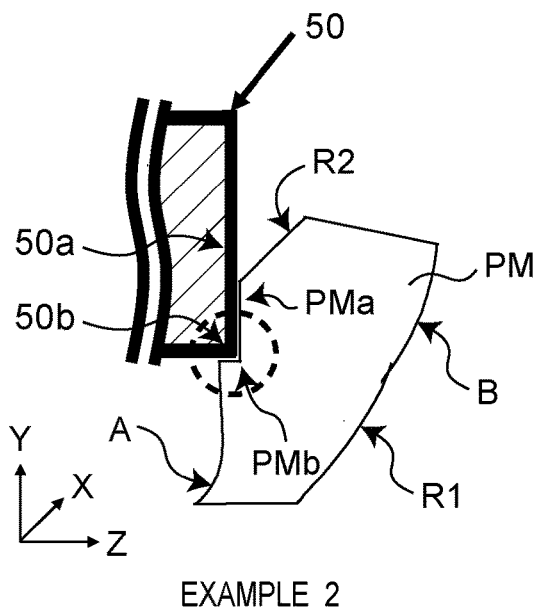
Figure 20C:
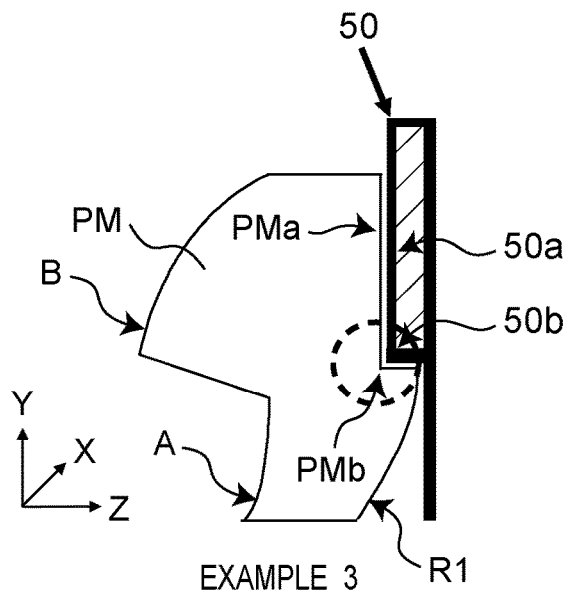
Figure 20D:
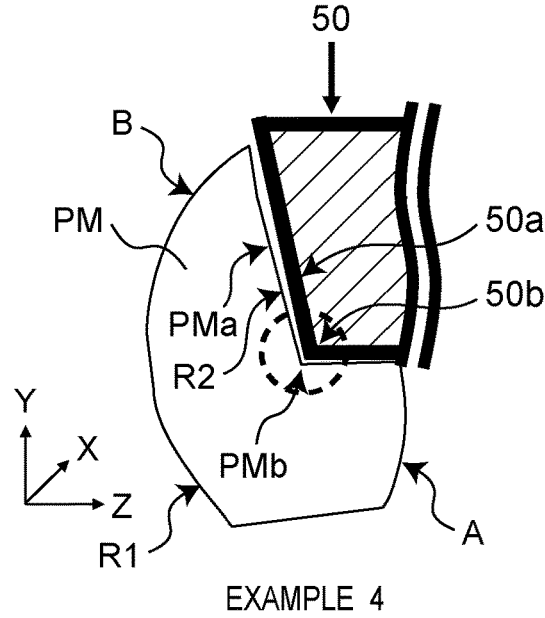

FIG. 18 is an explanatory diagram showing an example of an image region at the reduction conjugate point. The image region at the reduction conjugate point is defined as a rectangular region having a longitudinal direction (X-direction) and a lateral direction (Y-direction) and has an image-forming relationship that is optically conjugated to the image region at the magnification conjugate point. A light ray travels along a normal direction (Z-direction) of this rectangular region. This rectangular area has an aspect ratio such as 3:2, 4:3, 16:9, and 256:135, etc., corresponding to an image display region of an image forming element in the case of an image projection apparatus or to an imaging region of an imaging element in the case of an imaging apparatus.

An intermediate imaging position that is conjugated to both the reduction conjugate point and the magnification conjugate point is located inside the optical system 1. This intermediate imaging position is shown as a Y-direction intermediate image IMy in FIG. 1, but an X-direction intermediate image IMx is not shown and will be described later with reference to FIG. 4.

The first sub-optical system includes an optical element PA and lens elements L1 to L14 in this order from the reduction side to the magnification side. The optical element PA represents different optical elements, such as a TIR (total internal reflection) prism, a prism for color separation and color synthesis, an optical filter, a flat-parallel glass plate, a crystal low-pass filter, and an infrared cut filter. The original image SA is disposed on a reduction-side end face of the optical element PA (surface 1). For the surface number, see numerical examples described later.

The optical element PA has two parallel and flat transmission surfaces (surfaces 2, 3). The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are joined to each other to form a composite lens. The lens element L5 has a biconcave shape (surfaces 10, 11). The lens element L6 has a biconvex shape (surfaces 11, 12). The lens elements L5, L6 are joined to each other to form a composite lens.

The lens element L7 has a biconvex shape (surfaces 14, 15). The lens element L8 has a negative meniscus shape with the convex surfaces surface facing the magnification side (surfaces 16, 17). The lens element L9 has a positive meniscus shape with the convex surfaces facing the magnification side (surfaces 17, 18). The lens elements L8 and L9 are joined to each other to form a composite lens. The lens element L10 has a biconvex shape (surfaces 19, 20). The lens element L11 has a biconvex shape (surfaces 21, 22). The lens element L12 has a biconcave shape (surfaces 22, 23). The lens elements L11 and L12 are joined to each other to form a composite lens. The lens element L13 has a negative meniscus shape with the convex surfaces facing the reduction side (surfaces 24, 25). The lens element L14 has a positive meniscus shape with the convex surfaces facing the magnification side (surfaces 26, 27).

Figure 17E:
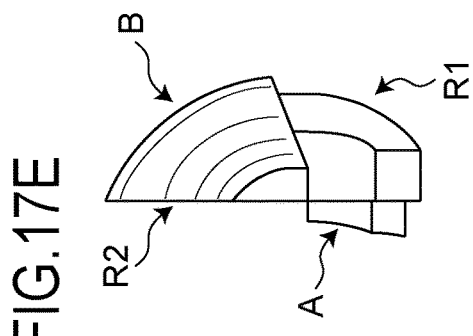
FIGS. 17A to 17E are diagrams schematically showing a three-dimensional shape of a prism PM according to the example 1.
Figure 17C:
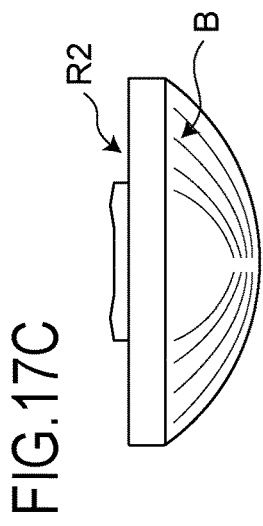
Figure 17B:
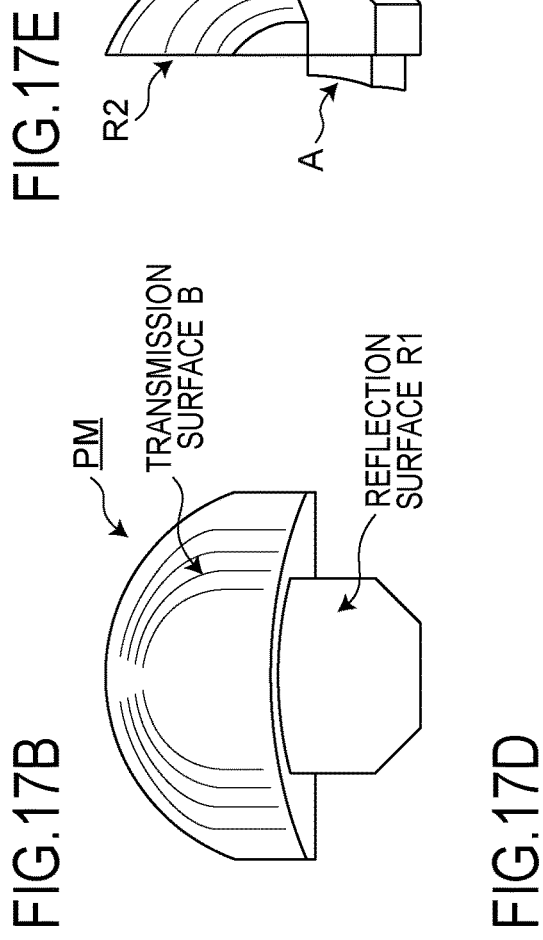
Figure 17D:
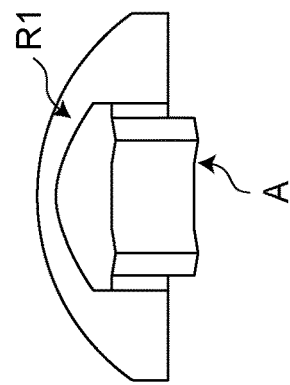
Figure 17A:
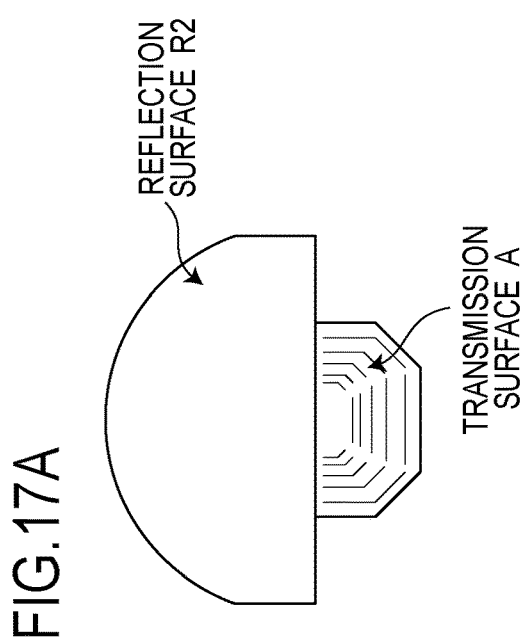

FIGS. 17A to 17E schematically show three-dimensional shapes of the prism PM according to the first example 1. FIG. 17A is a rear view, FIG. 17B a front view, FIG. 17C a top view, FIG. 17D a bottom view, and FIG. 17E a side view, respectively.

The second sub-optical system includes the prism PM made of a transparent medium, such as glass, synthetic resin. The prism PM has a transmission surface A located on the reduction side, a transmission surface B located on the magnification side, and two reflection surfaces R1, R2 located on an optical path between the transmission surface A and the transmission surface B. The transmission surface A has a free-form surface shape free-form surface shape with the concave surface facing the reduction side (surface 28). The reflection surface R1 has a free-form surface shape with the concave surface facing a direction into which a light ray incident on the reflection surface R1 is reflected (surface 29). The reflection surface R2 has a planar shape (surface 30). The transmission surface B has a free-form surface shape with the convex surface facing the magnification side (surface 31).

The aperture stop ST defines a range in which a light flux can pass through the optical system 1, and is positioned between the reduction conjugate point and the intermediate imaging position described above. For example, the aperture stop ST is located between the lens element L6 and the lens element L7 (surface 13).

A portion or whole of the intermediate images formed at the intermediate imaging position, i.e., the Y-direction intermediate image IMy and the X-direction intermediate image IMx, is positioned inside the medium of the prism PM.

In case the X-direction, the Y-direction, and the Z-direction are the longitudinal direction, the lateral direction, and the normal direction, respectively, of the rectangular region of the reduction conjugate point, when a Y cross-section is a plane including a position where a principal ray passing through the center in the X-direction is reflected by the reflection surface R1, and an X cross-section is a cross-section perpendicular to the Y cross-section, the light flux passing through the first sub-optical system has different intermediate imaging positions in the Y cross-section and the X cross-section, i.e., the Y-direction intermediate image IMy and the X-direction intermediate image IMx are formed at different positions. This can reduce an influence on image quality due to disturbances, such as dust and dirt.

Figure 2A:
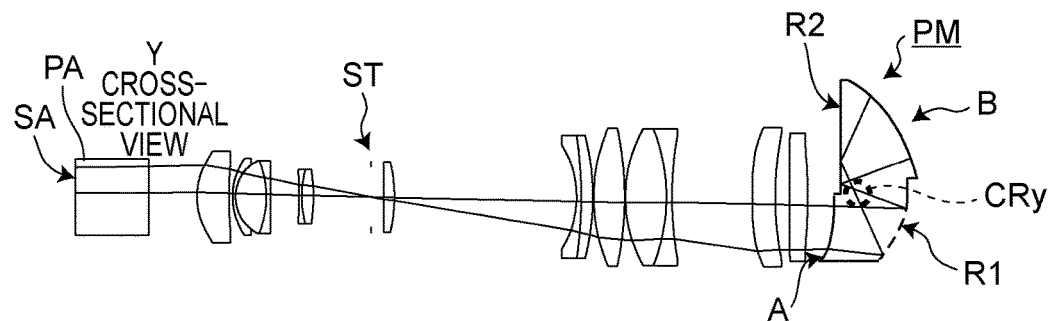
FIG. 2A is a Y cross-sectional view showing an optical path through which a principal ray passes in the optical system according to the example 1.
Figure 2B:
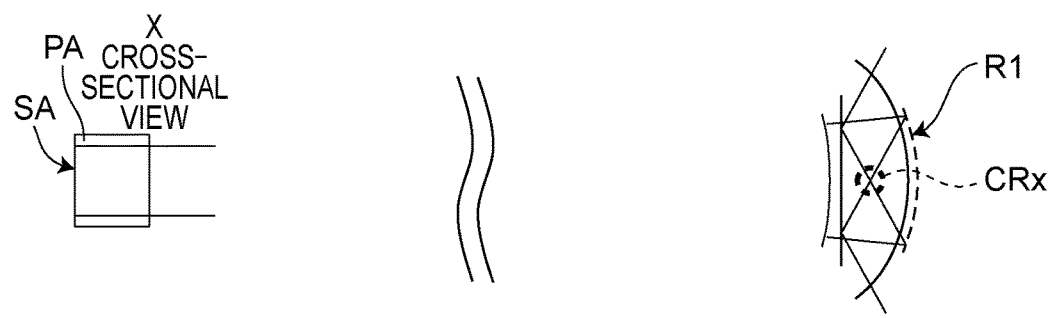
FIG. 2B is an X cross-sectional view when the optical system is viewed from above.

FIG. 2A is a Y cross-sectional view showing an optical path through which principal rays pass in the optical system 1 according to the example 1, and FIG. 2B is an X cross-sectional view when the optical system 1 is viewed from above. In FIG. 2B, a middle portion of the optical system 1 is not shown, and only the optical path inside the prism PM is schematically shown.

For clarification, FIG. 2A shows both of the principal ray passing through the center in the X-direction of the original image SA and the lowermost portion in the Y-direction (normalized height Y=0.0 at the reduction conjugate point) and the principal ray passing through the center in the X-direction of the original image SA and the uppermost portion in the Y-direction (normalized height Y=1.0 at the reduction conjugate point). Both principal rays pass through the first sub-optical system and then the transmission surface A to enter the inside of the prism PM, and subsequently are reflected by the reflection surface R1, and then intersect each other in a region CRy (indicated by a dashed line circle) before reaching the reflection surface R2.

For clarification, FIG. 2B shows both of the principal ray passing through a left-hand end in the X-direction of the original image SA and the principal ray passing through a right-hand end in the X-direction of the original image SA. Both principal rays pass through the first sub-optical system and then the transmission surface A to enter the inside of the prism PM, and subsequently are reflected by the reflection surface R1, and then intersect each other in a region CRx (indicated by a dashed line circle) before reaching the reflection surface R2.

In the present disclosure, a curvature shape of the free-form surface of the reflection surface R1 is set such that, as shown in FIG. 2A, some of the multiple principal rays passing through the reduction conjugate point intersect on the optical path between the reflection surface R1 and the transmission surface B as viewed in a direction perpendicular to the Y cross-section while, as shown in FIG. 2B, some of the multiple principal rays passing through the reduction conjugate point intersect on the optical path between the reflection surface R1 and the transmission surface B as viewed in a direction perpendicular to the X cross-section. With this configuration, the second sub-optical system can be miniaturized, and projection or imaging with a shorter focal length and a larger-sized screen can be realized by using a small-sized prism.

Figure 3:
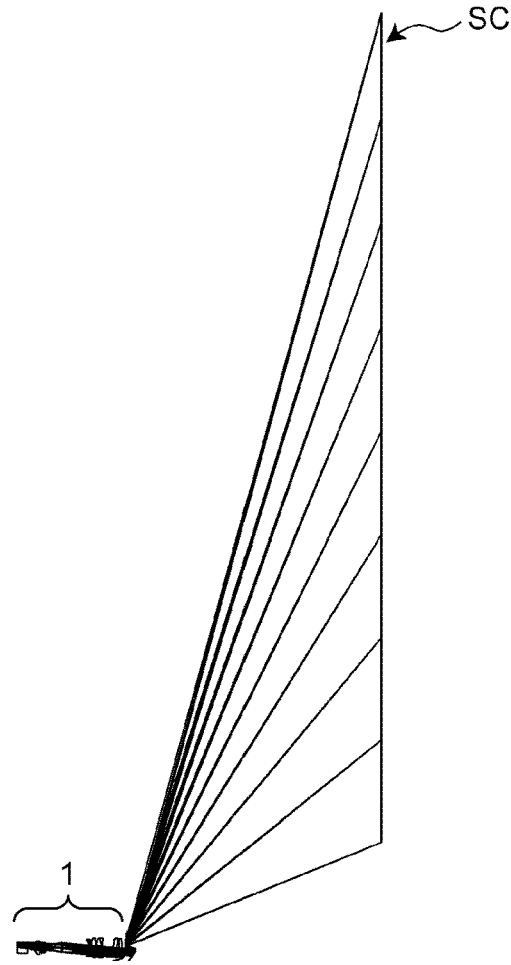
FIG. 3 is an explanatory diagram showing a usage form of an image projection apparatus using the optical system according to the example 1.

FIG. 3 is an explanatory diagram showing a usage form of the image projection apparatus using the optical system 1 according to the example 1. The image projection apparatus including the optical system 1 is horizontally located on a support, such as table, or on a floor. A screen SC is located upward in a vertical direction at a relatively short horizontal distance, for example, 0.5 m, from the support. Light generated from the optical system 1 is projected forward and obliquely upward to implement projection with a shorter focal length and a larger-sized screen.

Figure 4:
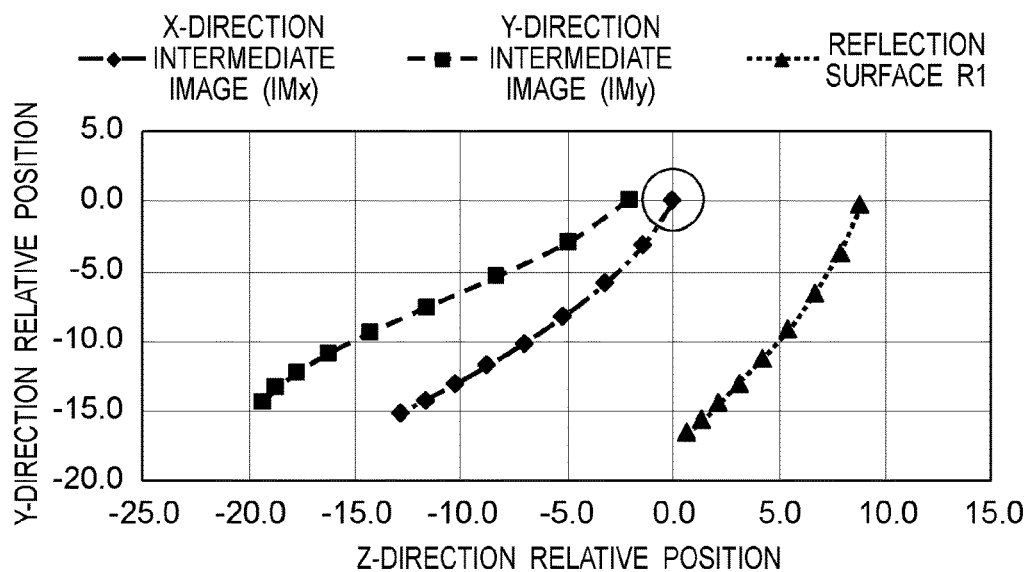
FIG. 4 is a graph showing a relative positional relationship of a reflection surface with a Y-direction intermediate image and an X-direction intermediate image in the optical system 1 according to the example 1.

FIG. 4 is a graph showing a relative positional relationship of the reflection surface R1 with the Y-direction intermediate image IMy and the X-direction intermediate image IMx in the optical system 1 according to the example 1 as viewed in a direction perpendicular to the Y cross-section. The horizontal axis indicates a relative position (unit: mm) in the Z direction with respect to IMx formed by the light ray passing through the center in the X-direction of the original image SA at the lowermost portion in the Y-direction, and the vertical axis indicates a relative position (unit: mm) in the Y-direction with respect to IMx formed by the light ray passing through the center in the X-direction of the original image SA at the lowermost portion in the Y-direction. Diamond marks indicate the X-direction intermediate image IMx, square marks indicate the Y-direction intermediate image IMy, and triangular marks indicate the curved shape of the reflection surface R1. At the X-direction intermediate image IMx the light flux passing through the optical system 1 is focused only in the X-direction and not in the Y-direction. At the Y-direction intermediate image IMy the light flux passing through the optical system 1 is focused only in the Y-direction and not in the X-direction.

Referring to the graph, the Y-direction intermediate image IMy is distributed from near the coordinates (−2.5, 0) to near the coordinates (−19.5, −14.5) obliquely with respect to the Z-direction. The X-direction intermediate image IMx is distributed from near the coordinates (0, 0) to near the coordinates (−13, −15) obliquely with respect to the Z-direction in a concave shape facing the reduction optical path side. The reflection surface R1 is distributed from near the coordinates (9, 0) to near the coordinates (0.5, −17) obliquely with respect to the Z-direction in a concave shape facing the reduction optical path side.

In the present disclosure, the reflection surface R1 may have a shape with a concave surface facing the reduction optical path side along the intermediate imaging position in the X-direction parallel to the X cross-section of the light ray passing through the center in the longitudinal direction of the above-mentioned rectangular region. As a result, image distortion on the screen SC can be suppressed.

Example 2

Figure 5:
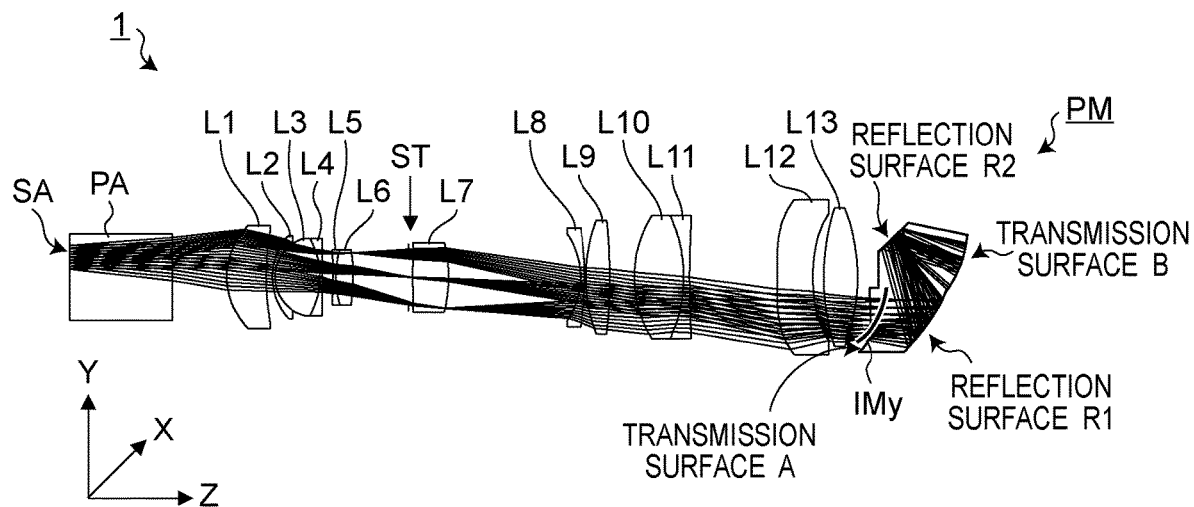
FIG. 5 is an arrangement diagram showing the optical system according to an example 2.

FIG. 5 is an arrangement diagram showing the optical system 1 according to an example 2. Although this optical system 1 has a configuration similar to the example 1, the first sub-optical system includes lens elements L1 to L13, and the second sub-optical system including the prism PM projects an image forward and obliquely downward in the case of an image projection apparatus. Hereinafter, the description overlapping with the example 1 will be omitted.

The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are joined to each other to form a composite lens. The lens element L5 has a biconcave shape (surfaces 10, 11). The lens element L6 has a biconvex shape (surfaces 11, 12). The lens elements L5 and L6 are joined to each other to form a composite lens.

The lens element L7 has a biconvex shape (surfaces 14, 15). The lens element L8 has a negative meniscus shape with the convex surfaces facing the magnification side (surfaces 16, 17). The lens element L9 has a biconvex shape (surfaces 18, 19). The lens element L10 has a biconvex shape (surfaces 20, 21). The lens element L11 has a biconcave shape (surfaces 21, 22). The lens elements L10 and L11 are joined to each other to form a composite lens. The lens element L12 has a negative meniscus shape with the convex surfaces facing the reduction side (surfaces 23, 24). The lens element L13 has a biconvex shape (surfaces 25, 26).

The prism PM has a transmission surface A located on the reduction side, a transmission surface B located on the magnification side, and two reflection surfaces R1, R2 located on an optical path between the transmission surface A and the transmission surface B. The transmission surface A has a free-form surface shape with the concave surface facing the reduction side (surface 27). The reflection surface R1 has a free-form surface shape with the concave surface facing a direction into which a light ray incident on the reflection surface R1 is reflected (surface 28). The reflection surface R2 has a planar shape (surface 29). The transmission surface B has a free-form surface shape with the convex surface facing the magnification side (surface 30).

Figure 6A:
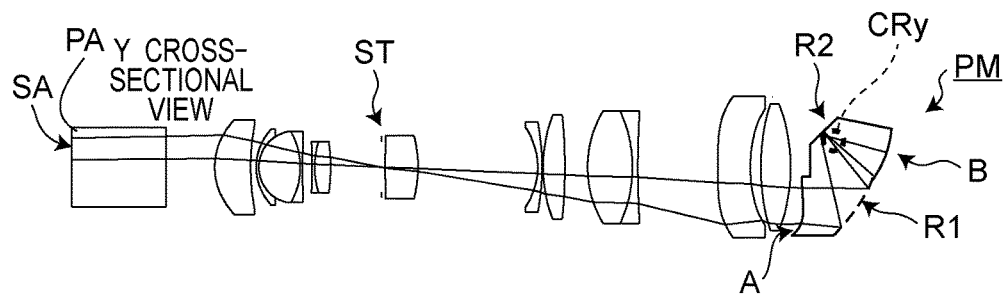
FIG. 6A is a Y cross-sectional view showing an optical path through which a principal ray passes in the optical system according to the example 2.
Figure 6B:
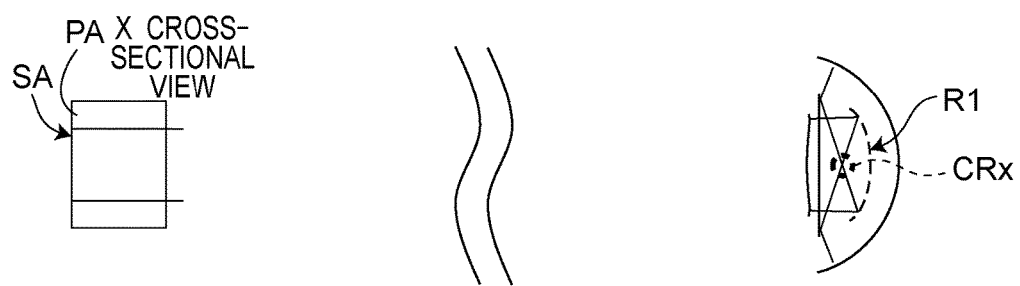
FIG. 6B is an X cross-sectional view when the optical system is viewed from above.

FIG. 6A is a Y cross-sectional view showing an optical path through which principal rays pass in the optical system 1 according to the example 2, and FIG. 6B is an X cross-sectional view when the optical system 1 is viewed from above.

For clarification, FIG. 6A shows both of the principal ray passing through the center in the X-direction of the original image SA and the lowermost portion in the Y-direction (normalized height Y=0.0 at the reduction conjugate point) and the principal ray passing through the center in the X-direction of the original image SA and the uppermost portion in the Y-direction (normalized height Y=1.0 at the reduction conjugate point). Both principal rays pass through the first sub-optical system and then the transmission surface A to enter the inside of the prism PM, and subsequently are reflected by the reflection surface R1, and then intersect each other in the region CRy (indicated by a dashed line circle) before reaching the reflection surface R2.

For clarification, FIG. 6B shows both of the principal ray passing through the left-hand end in the X-direction of the original image SA and the principal ray passing through the right-hand end in the X-direction of the original image SA. Both principal rays pass through the first sub-optical system and then the transmission surface A to enter the inside of the prism PM, and subsequently are reflected by the reflection surface R1, and then intersect each other in the region CRx (indicated by a dashed line circle) before reaching the reflection surface R2.

Figure 7:
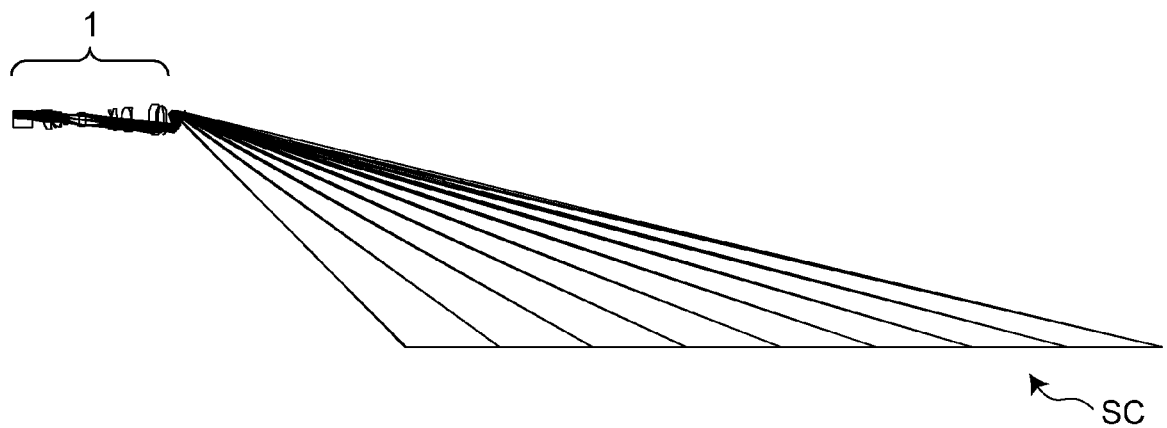
FIG. 7 is an explanatory diagram showing a usage form of an image projection apparatus using the optical system according to the example 2.

FIG. 7 is an explanatory diagram showing a usage form of the image projection apparatus using the optical system 1 according to the example 2. The image projection apparatus including the optical system 1 is horizontally located on a support, such as table, or on a floor. The screen SC is located forward in a horizontal direction at a relatively short vertical distance, for example, 0.3 m, from the support. Light generated from the optical system 1 is projected forward and obliquely downward to implement projection with a shorter focal length and a larger-sized screen.

Figure 8:
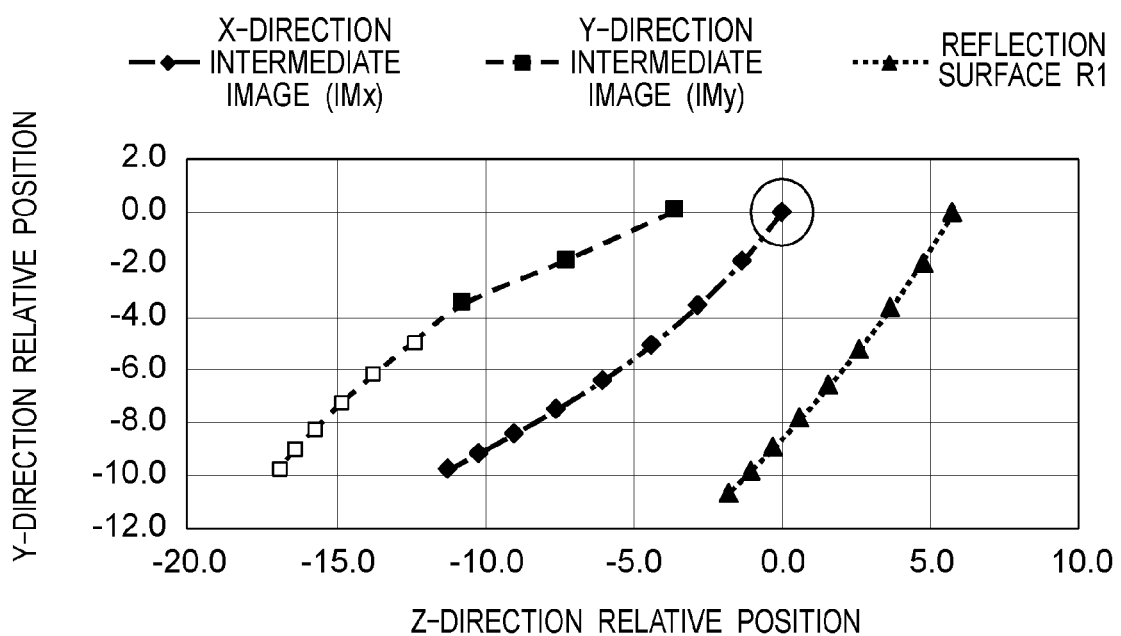
FIG. 8 is a graph showing a relative positional relationship of a reflection surface with a Y-direction intermediate image and an X-direction intermediate image in the optical system 1 according to the example 2.

FIG. 8 is a graph showing a relative positional relationship of the reflection surface R1 with the Y-direction intermediate image IMy and the X-direction intermediate image IMx in the optical system 1 according to the example 2 as viewed in a direction perpendicular to the Y cross-section.

Referring to the graph, the Y-direction intermediate image IMy is distributed from near the coordinates (−3.5, 0) to near the coordinates (−17, −10) obliquely with respect to the Z-direction. The X-direction intermediate image IMx is distributed from near the coordinates (0,0) to near the coordinates (−12, −10) obliquely with respect to the Z-direction in a concave shape facing the reduction optical path side. The reflection surface R1 is distributed from near the coordinates (5.5, 0) to near the coordinates (−2, −11) obliquely with respect to the Z-direction in a concave shape facing the reduction optical path side.

In the present disclosure, the reflection surface R1 may have a shape with a concave surface facing the reduction optical path side along the intermediate imaging position in the X-direction parallel to the X cross-section of the light ray passing through the center in the longitudinal direction of the above-mentioned rectangular region. As a result, image distortion on the screen SC can be suppressed.

Example 3

Figure 9:
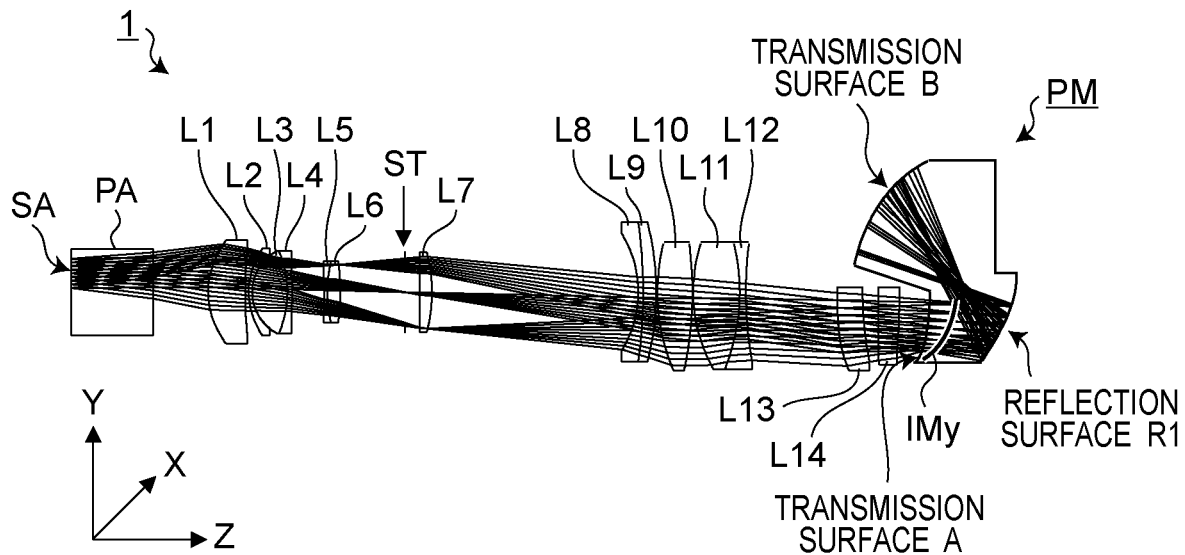
FIG. 9 is an arrangement diagram showing the optical system according to an example 3.

FIG. 9 is an arrangement diagram showing the optical system 1 according to an example 3. Although this optical system 1 has a configuration similar to the example 1, the first sub-optical system includes lens elements L1 to L14, and the second sub-optical system including the prism PM projects an image backward and obliquely upward in the case of an image projection apparatus. Hereinafter, the description overlapping with the example 1 will be omitted.

The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are joined to each other to form a composite lens. The lens element L5 has a biconcave shape (surfaces 10, 11). The lens element L6 has a biconvex shape (surfaces 11, 12). The lens elements L5 and L6 are joined to each other to form a composite lens.

The lens element L7 has a biconvex shape (surfaces 14, 15). The lens element L8 has a negative meniscus shape with the convex surfaces facing the magnification side (surfaces 16, 17). The lens element L9 has a positive meniscus shape with a convex surface facing the magnification side (surfaces 17, 18). The lens elements L8 and L9 are joined to each other to form a composite lens. The lens element L10 has a biconvex shape (surfaces 19, 20). The lens element L11 has a biconvex shape (surfaces 21, 22). The lens element L12 has a biconcave shape (surfaces 22, 23). The lens elements L11 and L12 are joined to each other to form a composite lens. The lens element L13 has a negative meniscus shape with the convex surfaces facing the reduction side (surfaces 24, 25). The lens element L14 has a positive meniscus shape with the convex surfaces facing the magnification side (surfaces 26, 27).

The prism PM has a transmission surface A located on the reduction side, a transmission surface B located on the magnification side, and one reflection surface R1 located on an optical path between the transmission surface A and the transmission surface B. The transmission surface A has a free-form surface shape with the concave surface facing the reduction side (surface 28). The reflection surface R1 has a free-form surface shape with the concave surface facing a direction into which a light ray incident on the reflection surface R1 is reflected (surface 29). The transmission surface B has a free-form surface shape with the convex surface facing the magnification side (surface 30).

Figure 10A:
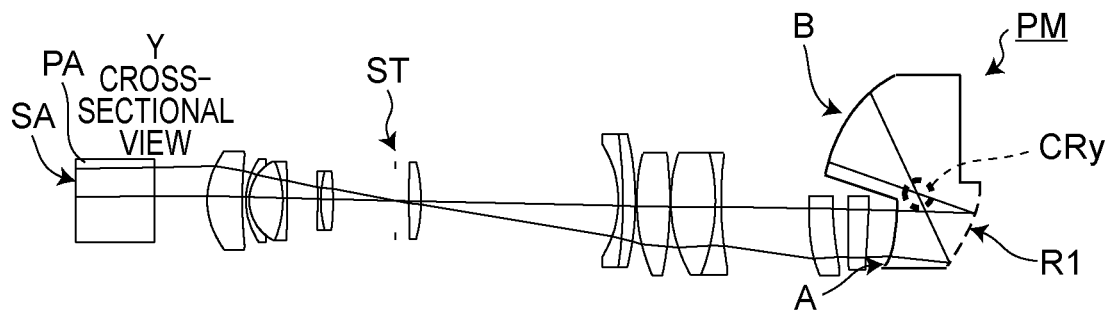
FIG. 10A is a Y cross-sectional view showing an optical path through which a principal ray passes in the optical system according to the example 3.
Figure 10B:
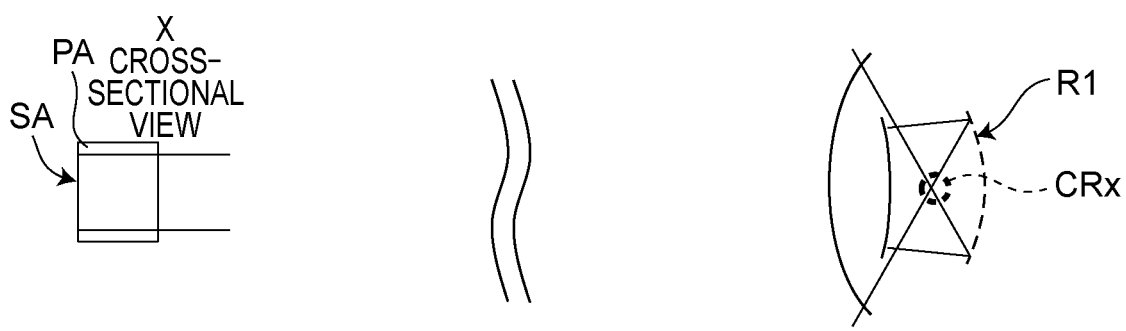
FIG. 10B is an X cross-sectional view when the optical system is viewed from above.

FIG. 10A is a Y cross-sectional view showing an optical path through which principal rays pass in the optical system 1 according to the example 3, and FIG. 10B is an X cross-sectional view when the optical system 1 is viewed from above.

For clarification, FIG. 10A shows both of the principal ray passing through the center in the X-direction of the original image SA and the lowermost portion in the Y-direction (normalized height Y=0.0 at the reduction conjugate point) and the principal ray passing through the center in the X-direction of the original image SA and the uppermost portion in the Y-direction (normalized height Y=1.0 at the reduction conjugate point). Both principal rays pass through the first sub-optical system and then the transmission surface A to enter the inside of the prism PM, and subsequently are reflected by the reflection surface R1, and then intersect each other in the region CRy (indicated by a dashed line circle) before reaching the transmission surface B.

For clarification, FIG. 10B shows both of the principal ray passing through the left-hand end in the X-direction of the original image SA and the principal ray passing through the right-hand end in the X-direction of the original image SA. Both principal rays pass through the first sub-optical system and then the transmission surface A to enter the inside of the prism PM, and subsequently are reflected by the reflection surface R1, and then intersect each other in the region CRx (indicated by a broken dashed line circle) before reaching the transmission surface B.

Figure 11:
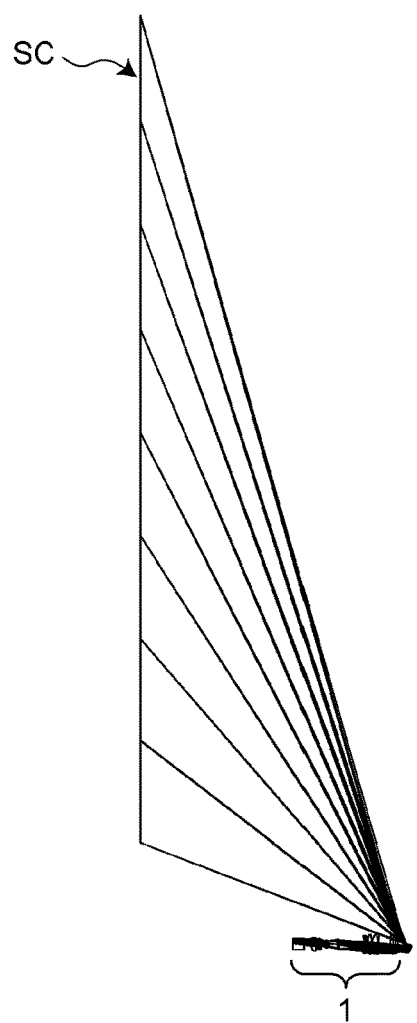
FIG. 11 is an explanatory diagram showing a usage form of an image projection apparatus using the optical system according to the example 3.

FIG. 11 is an explanatory diagram showing a usage form of the image projection apparatus using the optical system 1 according to the example 3. The image projection apparatus including the optical system 1 is horizontally located on a support, such as table, or on a floor. The screen SC is located upward in a vertical direction at a relatively short horizontal distance, for example, 0.6 m, on the rear side from the support. Light generated from the optical system 1 is projected backward and obliquely upward to implement projection with a shorter focal length and a larger-sized screen.

Figure 12:
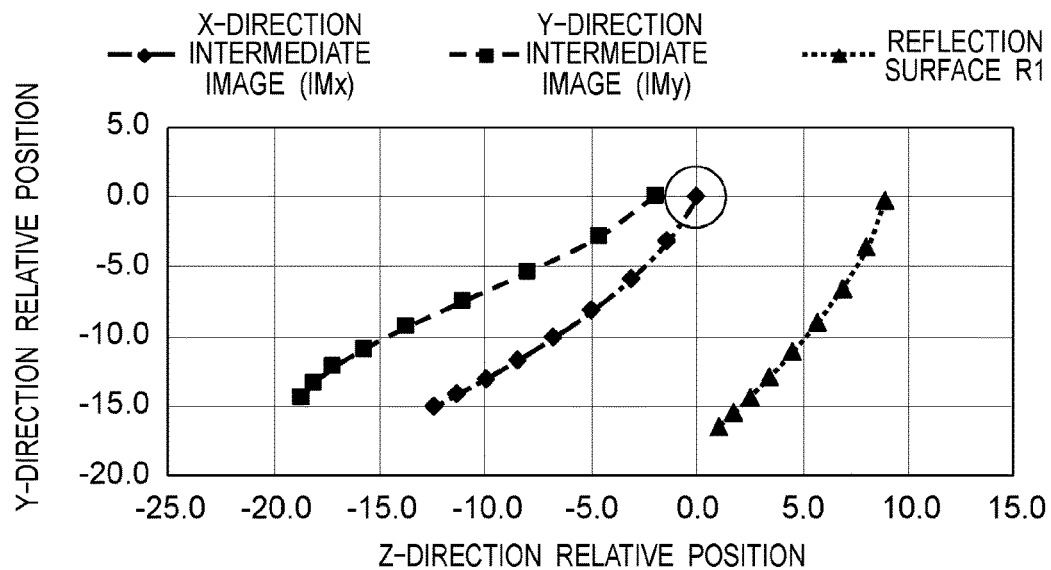
FIG. 12 is a graph showing a relative positional relationship of a reflection surface with a Y-direction intermediate image and an X-direction intermediate image in the optical system according to the example 3.

FIG. 12 is a graph showing a relative positional relationship of the reflection surface R1 with the Y-direction intermediate image IMy and the X-direction intermediate image IMx in the optical system 1 according to the example 3 as viewed in a direction perpendicular to the Y cross-section.

Referring to the graph, the Y-direction intermediate image IMy is distributed from near the coordinates (−2, 0) to near the coordinates (−19, −14.5) obliquely with respect to the Z-direction. The X-direction intermediate image IMx is distributed from near the coordinates (0, 0) to near the coordinates (−12.5, −15) obliquely with respect to the Z-direction in a concave shape facing the reduction optical path side. The reflection surface R1 is distributed from near the coordinates (9,0) to near the coordinates (1, −17) obliquely with respect to the Z-direction in a concave shape facing the reduction optical path side.

In the present disclosure, the reflection surface R1 may have a shape with a concave surface facing the reduction optical path side along the intermediate imaging position in the X-direction parallel to the X cross-section of the light ray passing through the center in the longitudinal direction of the above-mentioned rectangular region. As a result, image distortion on the screen SC can be suppressed.

Example 4

Figure 13:
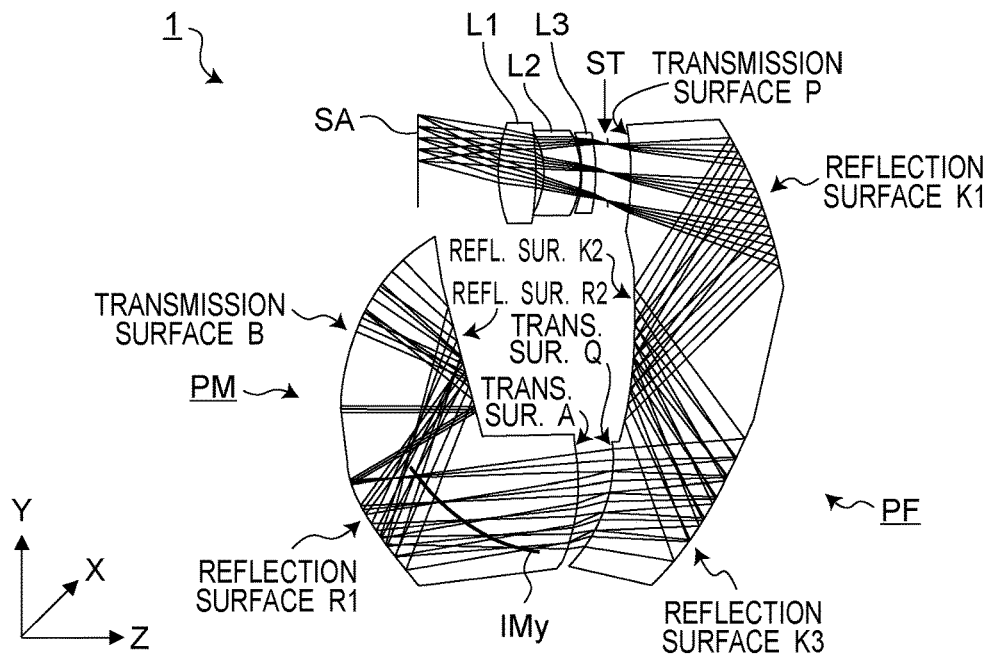
FIG. 13 is an arrangement diagram showing the optical system according to an example 4.

FIG. 13 is an arrangement diagram showing the optical system 1 according to an example 4. Although this optical system 1 has a configuration similar to the example 1, the first sub-optical system includes lens elements L1 to L3 and a prism PF, and the second sub-optical system including the prism PM projects an image backward and obliquely upward in the case of an image projection apparatus. Hereinafter, the description overlapping with the example 1 will be omitted.

The lens element L1 has a biconvex shape (surfaces 2, 3). The lens element L2 has a negative meniscus shape with the convex surfaces facing the magnification side (surfaces 4, 5). The lens element L3 has a negative meniscus shape with the convex surfaces facing the magnification side (surfaces 6, 7).

Similarly to the prism PM, the prism PF is made of a transparent medium such as glass, synthetic resin. The prism PF has a transmission surface P located on the reduction side, a transmission surface Q located on the magnification side, and three reflection surfaces K1, K2, K3 located on an optical path between the transmission surface P and the transmission surface Q. The transmission surface P has a free-form surface shape with the concave surface facing the reduction side (surface 9). The reflection surface K1 has a free-form surface shape with the concave surface facing the reduction side and the magnification side (surface 10). The reflection surface K2 has a free-form surface shape with the convex surface facing the reduction side and the magnification side (surface 11). The reflection surface K3 has a free-form surface shape with the concave surface facing the reduction side and the magnification side (surface 12). The transmission surface Q has a free-form surface shape with the convex surface facing the reduction side (surface 13).

The prism PM has a transmission surface A located on the reduction side, a transmission surface B located on the magnification side, and two reflection surfaces R1, R2 located on an optical path between the transmission surface A and the transmission surface B. The transmission surface A has a free-form surface shape with the convex surface facing the reduction side (surface 14). The reflection surface R1 has a free-form surface shape with the concave surface facing the reduction side and the magnification side (surface 15). The reflection surface R2 has a free-form surface shape with the convex surface facing in a direction into which a light ray incident on the reflection surface R1 is reflected (surface 16). The transmission surface B has a free-form surface shape with the convex surface facing the magnification side (surface 17).

The aperture stop ST defines the range in which a light flux can pass through the optical system 1, and is positioned between the reduction conjugate point and the intermediate imaging position described above. For example, the aperture stop ST is located between the lens element L3 and the transmission surface P of the prism PM (surface 8).

Figure 14A:
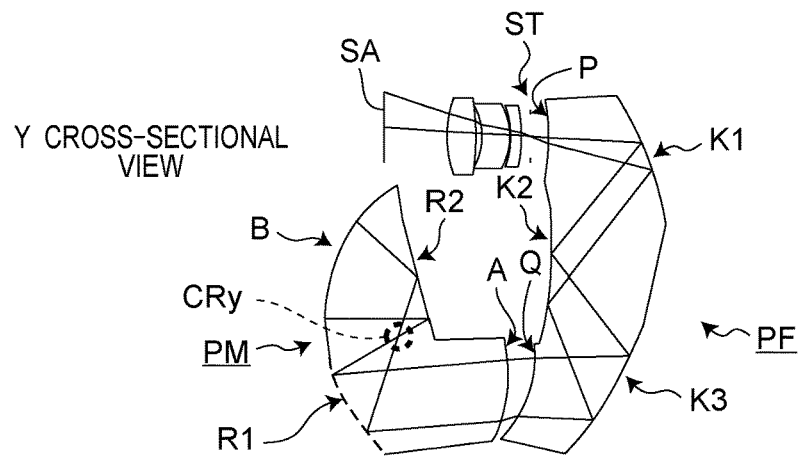
FIG. 14A is a Y cross-sectional view showing an optical path through which a principal ray passes in the optical system according to the example 4.
Figure 14B:
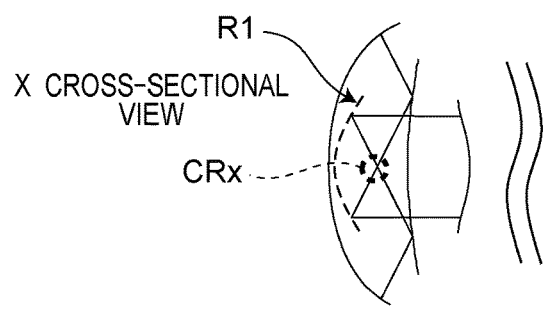
FIG. 14B is an X cross-sectional view when the optical system is viewed from above.

FIG. 14A is a Y cross-sectional view showing an optical path through which principal rays pass in the optical system 1 according to the example 4, and FIG. 14B is an X cross-sectional view when the optical system 1 is viewed from above.

For clarification, FIG. 14A shows both of the principal ray passing through the center in the X-direction of the original image SA and the lowermost portion in the Y-direction (normalized height Y=0.0 at the reduction conjugate point) and the principal ray passing through the center in the X direction of the original image SA and the uppermost portion in the Y-direction (normalized height Y=1.0 at the reduction conjugate point). Both principal rays pass through the first sub-optical system and then the transmission surface A to enter the inside of the prism PM, and subsequently are reflected by the reflection surface R1, and then intersect each other in the region CRy (indicated by a dashed line circle) before reaching the transmission surface R2.

For clarification, FIG. 14B shows both of the principal ray passing through the left-hand endin the X-direction of the original image SA and the principal ray passing through the right-hand end in the X-direction of the original image SA. Both principal rays pass through the first sub-optical system and then the transmission surface A to enter the inside of the prism PM, and subsequently are reflected by the reflection surface R1, and then intersect each other in the region CRx (indicated by a dashed line circle) before reaching the reflection surface R2.

Figure 15:
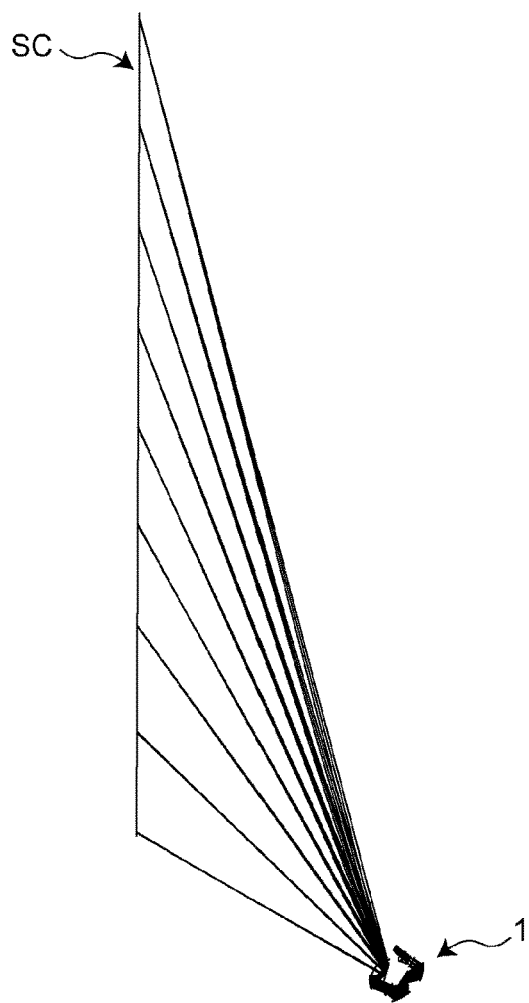
FIG. 15 is an explanatory diagram showing a usage form of an image projection apparatus using the optical system according to the example 4.

FIG. 15 is an explanatory diagram showing a usage form of an image projection apparatus using the optical system 1 according to the example 4. The image projection apparatus including the optical system 1 is horizontally located on a support, such as table, or on a floor. The screen SC is located upward in a vertical direction at a relatively short horizontal distance, for example, 0.2 m, on the rear side from the support. Light generated from the optical system 1 is projected backward and obliquely upward to implement projection with a shorter focal length and a larger-sized screen.

Figure 16:
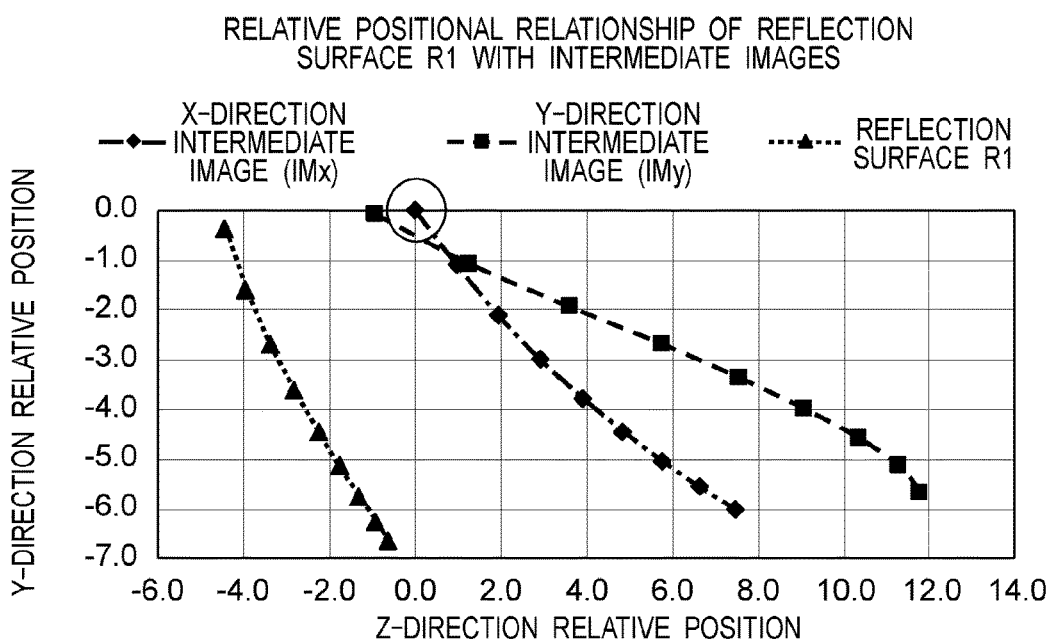
FIG. 16 is a graph showing a relative positional relationship of a reflection surface with a Y-direction intermediate image and an X-direction intermediate image in the optical system according to the example 4.

FIG. 16 is a graph showing a relative positional relationship of the reflection surface R1 with the Y-direction intermediate image IMy and the X-direction intermediate image IMx in the optical system 1 according to the example 4 as viewed in a direction perpendicular to the Y cross-section.

Referring to the graph, the Y-direction intermediate image IMy is distributed from near the coordinates (−1, 0) to near the coordinates (12, −5.7) obliquely with respect to the Z-direction. The X-direction intermediate image IMx is distributed from near the coordinates (0, 0) to near the coordinates (7.5, −6) obliquely with respect to the Z-direction in a concave shape facing the reduction optical path side. The reflection surface R1 is distributed from near the coordinates (−4.5, −0.5) to near the coordinates (−0.8, −6.8) obliquely with respect to the Z-direction in a concave shape facing the reduction optical path side.

In the present disclosure, the reflection surface R1 may have a shape with a concave surface facing the reduction optical path side along the intermediate imaging position in the X-direction parallel to the X cross-section of the light ray passing through the center in the longitudinal direction of the above-mentioned rectangular region. As a result, image distortion on the screen SC can be suppressed. In the optical system 1 according to the example 4, the prism PF and the prism PM made of media having different refractive indexes and Abbe numbers are more effective for correction of the chromatic aberration of magnification than the prisms made of the same medium.

Next, conditions which the optical system according to the examples 1 to 4 can satisfy are described below. Although a plurality of the conditions are defined for the optical system according to each of the examples, all of these plurality of conditions may be satisfied, or the individual conditions may be satisfied to obtain the corresponding effects.

The optical system according to this embodiment is the optical system 1 having a reduction conjugation point on the reduction side and a magnification conjugation point on the magnification side and internally having an intermediate imaging position that is conjugated to both the reduction conjugation point and the magnification conjugation point, wherein the reduction conjugate point has an image-forming relationship in a rectangular region having a longitudinal direction and a lateral direction, wherein the optical system includes the first sub-optical system including the aperture stop ST defining a range in which a light flux can pass through the optical system 1 and the second sub-optical system disposed on the magnification side of the first sub-optical system and including the prism PM made of a transparent medium, wherein the prism PM has the transmission surface A located on the reduction side, the transmission surface B located on the magnification side, and the at least one reflection surface R1 located on an Optical path between the transmission surface A and the transmission surface B, wherein the aperture stop ST is positioned between the reduction conjugate point and the intermediate imaging position, wherein a portion or whole of intermediate images IMx, IMy formed at the intermediate imaging position are positioned inside the medium of the prism PM, wherein the reflection surface R1 closest to the intermediate imaging position has a shape with a concave surface facing a direction into which a light ray incident on the reflection surface R1 is reflected, wherein the transmission surface B has a shape with a convex surface facing the magnification side, and wherein in case an X-direction, a Y-direction, and a Z-direction are a longitudinal direction, a lateral direction, and a normal direction, respectively, of the rectangular region of the reduction conjugate point, when a Y cross-section is a plane including a position where a principal ray passing through the center in the X-direction is reflected by the reflection surface R1, and an X cross-section is a cross-section perpendicular to the Y cross-section, a curvature shape of the reflection surface R1 may be set such that some of multiple principal rays passing through the reduction conjugate point intersect on the optical path between the reflection surface R1 and the transmission surface B as viewed in a direction perpendicular to the Y cross-section while some of multiple principal rays passing through the reduction conjugate point intersect on the optical path between the reflection surface R1 and the transmission surface B as viewed in a direction perpendicular to the X cross-section.

With this configuration, multiple principal rays intersect on the optical path between the reflection surface R1 and the transmission surface B of the prism for both the Y cross-section and the X cross-section. Therefore, the second sub-optical system can be miniaturized, and projection or imaging with a shorter focal length and a larger-sized screen can be realized by using a small-sized prism.

In the optical system according to this embodiment, the reflection surface R1 may have a shape with a concave surface facing the reduction optical path side along the intermediate imaging position in the X-direction parallel to the X cross-section of the light ray passing through the center in the longitudinal direction of the rectangular region.

With this configuration, image distortion on the screen SC can be suppressed.

In the optical system according to this embodiment, the light flux passing through the first sub-optical system may include different intermediate imaging positions in the Y cross-section and the X cross-section.

With this configuration, the imaging magnification ratios can independently be set in the X-direction and the Y-direction, with an increased degree of freedom in design.

FIG. 19 is an explanatory diagram showing definitions of imaging magnification ratios MX, MY at the intermediate imaging position and imaging magnification ratios MMX, MMY at the magnification conjugate point. In the optical system according to the present disclosure, the reduction conjugate point, the intermediate imaging position, and the magnification conjugate point are optically conjugated to one another.

In the Y-direction, a length $\Delta Y1$ at the reduction conjugate point, a length $\Delta Y2$ at the intermediate imaging position in the Y-direction, and a length $\Delta Y3$ at the magnification conjugate point are imaged at predetermined magnification ratios, respectively. In this case, the imaging magnification ratio MY at the intermediate imaging position in the Y-direction parallel to the Y cross-section with respect to the reduction conjugate point and the Y-direction imaging magnification ratio MMY at the magnification conjugate point with respect to the reduction conjugate point are given by the following equations:

$$MY=|\Delta Y2/\Delta Y1|$$

$$MMY=|\Delta Y3/\Delta Y1|$$

Similarly, in the X-direction, a length $\Delta X1$ at the reduction conjugate point, a length $\Delta X2$ at the intermediate imaging position in the X-direction, and a length $\Delta X3$ at the magnification conjugate point are imaged at predetermined magnification ratios, respectively. In this case, the imaging magnification ratio MX at the intermediate imaging position in the X-direction parallel to the X cross-section with respect to the reduction conjugate point and the X-direction imaging magnification ratio MMX at the magnification conjugate point with respect to the reduction conjugate point are given by the following equations:

$$MX=|\Delta X2/\Delta X1|$$

$$MMX=|\Delta X3/\Delta X1|$$

The optical system according to this embodiment may satisfy the following condition (1a) or condition (1b):

$$0<|MX|<10 \tag{1a}$$

$$0<|MY|<10 \tag{1b}$$

where MX is the imaging magnification ratio at the intermediate imaging position in the X-direction parallel to the X cross-section with respect to the reduction conjugate point, and MY is the imaging magnification ratio at the intermediate imaging position in the Y-direction parallel to the Y cross-section with respect to the reduction conjugate point.

With this configuration, the intermediate imaging position can appropriately be set, and image distortion on the screen SC can be suppressed while maintaining the second sub-optical system in small size. Additionally, in the range described above, a difference between the X-direction imaging magnification ratio and the Y-direction imaging magnification ratio on the screen SC can be made as small as possible. If exceeding the upper limit of the condition (1a) or the condition (1b), the intermediate image formed in the second sub-optical system becomes larger, which makes it difficult to maintain the small size. It is preferable that the imaging magnification ratios MX, MY at the intermediate imaging position are set to gradually decrease from the normalized height Y=0 toward Y=1 at the reduction conjugate point. As a result, the curvature of field at the intermediate imaging position can be set on the under side (the reduction optical path side), and the curvature of field on the screen SC can be suppressed within a favorable range.

Furthermore, the effect described above can be enhanced by satisfying the following condition (1c) or (1d):

$$0.5<|MX|<7.5 \tag{1c}$$

$$0.5<|MY|<7.5 \tag{1d}$$

Furthermore, the effect described above can be enhanced by satisfying the following condition (1e) or (1f):

$$0.6<|MX|<5.0 \tag{1e}$$

$$0.6<|MY|<5.0 \tag{1f}$$

The optical system according to this embodiment may satisfy the following condition (2):

$$|MX|>|MY| \tag{2}$$

With this configuration, a difference between the X-direction imaging magnification ratio and the Y-direction imaging magnification ratio on the screen SC can be made as small as possible. If the condition (2) is not satisfied, a difference between the X-direction imaging magnification ratio and the Y-direction imaging magnification ratio on the screen SC may be produced, which makes it difficult to maintain appropriate optical performance.

In the optical system according to this embodiment, the intermediate imaging position in the X-direction may exist between the intermediate imaging position in the Y-direction and the reflection surface R1.

With this configuration, a difference between the X-direction imaging magnification ratio and the Y-direction imaging magnification ratio on the screen SC can be made as small as possible.

The optical system according to this embodiment may satisfy the following condition (3):

$$\Sigma(|OPLY|-|OPLX|)>0 \tag{3}$$

where OPLX is an optical path length between the intermediate imaging position in the X-direction and the reflection surface R1, and OPLY is an optical path length between the intermediate imaging position in the Y-direction and the reflection surface R1, and $\Sigma(|OPLY|-|OPLX|)$ is a total value obtained by adding the difference between the absolute value of the optical path length OPLX and the absolute value of the optical path length OPLY for three principal rays passing through the normalized heights Y=0.0, 0.5, 1.0 at the reduction conjugate point.

With this configuration, a difference between the X-direction imaging magnification ratio and the Y-direction imaging magnification ratio on the screen SC can be made as small as possible. If falling below the lower limit of the condition (3), the Y-direction imaging magnification ratio becomes smaller than the X-direction imaging magnification ratio on the screen SC, which makes it difficult to appropriately reproduce the original image SA.

Furthermore, the effect described above can be enhanced by satisfying the following condition (3a):

$$\Sigma(|OPLY|-|OPLX|)>2.5 \tag{3a}$$

Furthermore, the effect described above can be enhanced by satisfying the following condition (3b):

$$\Sigma(|OPLY|-|OPLX|)>5.0 \tag{3b}$$

The optical system according to this embodiment may satisfy the following condition (4):

$$|2\times(MMX-MMY)/(MMX+MMY)|<0.30 \tag{4}$$

where MMX is the X-direction imaging magnification ratio at the magnification conjugate point with respect to the reduction conjugate point, and MMY is the Y-direction imaging magnification ratio at the magnification conjugate point with respect to the reduction conjugate point.

With this configuration, image distortion on the screen SC can be suppressed, and a difference between the X-direction imaging magnification ratio and the Y-direction imaging magnification ratio can be made as small as possible. If exceeding the upper limit of the condition (4), the Y-direction imaging magnification ratio becomes different from the X-direction imaging magnification ratio on the screen SC, which makes it difficult to appropriately reproduce the original image SA. The condition (4) defines a range in which the original image SA can be appropriately reproduced on the screen SC.

Furthermore, the effect described above can be enhanced by satisfying the following condition (4a):

$$|2\times(MMX-MMY)/(MMX+MMY)|<0.15 \tag{4a}$$

Furthermore, the effect described above can be enhanced by satisfying the following condition (4b):

$$|2\times(MMX-MMY)/(MMX+MMY)|<0.08 \tag{4b}$$

The optical system according to this embodiment may satisfy the following condition (5):

$$|\theta i|<50 \tag{5}$$

where $\theta i$ is an incident angle (unit: degrees) relative to the normal of the transmission surface B at the position where a principal ray is incident on the transmission surface B when the principal ray passes through the transmission surface B of the medium.

With this configuration, the light reflected by the transmitting surface B can be suppressed when passing through the transmitting surface B, and a loss of the transmitted light can be reduced, so that a decrease in amount of light of a projected image can be suppressed.

In the optical system according to this embodiment, the transmission surface B may have the maximum effective area among the transmission surface A, the transmission surface B, and the at least one reflection surface R1.

With this configuration, a uniform amount of light can be achieved in the projected image.

In the optical system according to this embodiment, the aperture stop ST may be positioned between the reduction conjugate point and the transmission surface A.

With this configuration, the prism PM can be miniaturized.

In the optical system according to this embodiment, all of the multiple principal rays passing through the reduction conjugate point may intersect on the optical path between the reflection surface R1 and the transmission surface B.

With this configuration, the second sub optical system can be miniaturized and projection or imaging with a shorter focal length and a larger-sized screen can be realized by using a small-sized prism.

In the optical system according to this embodiment, either an entrance pupil or an exit pupil corresponding to the aperture stop may be positioned in the prism. The entrance pupil is an image of the aperture stop viewed from the reduction side. The exit pupil is an image of the aperture stop viewed from the magnification side.

With this configuration, the second sub optical system can be miniaturized and projection or imaging with a shorter focal length and a larger-sized screen can be realized by using a small-sized prism.

In the optical system according to this embodiment, the intermediate imaging position may be positioned away from the reflection surface R1 toward the reduction side.

With this configuration, image distortion on the screen SC can be suppressed.

FIGS. 20A to 20D are Y-directional cross-sectional views showing various examples of a stepped structure of the prism PM. Various lens elements and various prisms constituting the optical system 1 are generally attached to the inside of a lens barrel 50 by using an adhesive, brackets, etc. In this case, a highly accurate mounting structure is required to faithfully reproduce various dimensions of an optical design.

The prism PM is provided with, for example, an end surface PMa and an inside corner PMb each serving as attachment references. On the other hand, the lens barrel 50 is provided with an end surface 50a and an outside corner 50b each corresponding to the shapes of the end surface PMa and the inside corner PMb. During attachment, the end surface PMa and the end surface 50a are matched and the inside corner PMb and the outside corner 50b are matched, so that the prism PM can be highly accurately and stably fixed to the lens barrel 50.

The optical system according to this embodiment may have a stepped structure formed on an outer circumferential portion of the prism PM.

With this configuration, the prism can be highly accurately and stably attached to an outer housing.

Regarding the optical system according to this embodiment, the optical system may be an imaging optical system.

With this configuration, the second sub-optical system can be miniaturized, and projection or imaging with a shorter focal length and a larger-sized screen can be realized by using a small-sized prism.

Hereinafter, numerical examples of the optical system according to examples 1 to 4 are described. In each of the numerical examples, in the table, the unit of length is all "mm", and the unit of angle of view is all "°" (degree). Further, in each of the numerical examples, radius of curvature, surface interval, Nd (refractive index for d line), vd (Abbe number for d line), N550 (refractive index at a wavelength of 550 nm), eccentricity data (displacements X, Y, Z of a prism surface with respect to the previous surface and normal directions α, β, γ of the prism surface with respect to the previous surface in the optical system) are listed. The term "variable" in the surface interval means that it can be varied depending on the size of image (e.g., 100"(inch), 80", 60", etc.) on the magnification conjugate point. Furthermore, in each of the numerical examples, the aspherical (ASP) shape is defined by the following formula, where for the aspherical coefficient, only non-zero coefficients are shown other than conic constant.

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18}$$

[Mathematical Formula 1]

where, Z is a sag height of a surface as measured in parallel to z-axis, r is a distance in the radial direction ($=\sqrt{(x^2+y^2)}$), c is a vertex curvature, k is a conic constant, and A to H are 4th to 18th order aspherical coefficients.

A free-form surface (FFS) shape is defined by the following formulas using a local Cartesian coordinate system with the vertex thereof as origin point.

$$z = \frac{cr^2}{1+\sqrt{1-(1+k)c^2r^2}} + \sum_{j=2}^{137} C_j x^m y^n$$

[Mathematical Formula 2]

$$j = \frac{(m+n)^2 + m + 3n}{2} + 1$$

[Mathematical Formula 3]

where, Z is a sag height of a surface as measured in parallel to z-axis, r is a distance in the radial direction ($=\sqrt{(x^2+y^2)}$), c is a vertex curvature, k is a conic constant, and $C_j$ is a coefficient of a monomial $X^m y^n$.

Further, in the following data table, member of ith-order of x and jth-order of y, showing a free-form surface coefficient in the polynomial formula, is expressed by the shorthand notation "X\*\*i\*Y\*\*j". For example, a notation "X\*\*2\*Y" shows a free-form surface coefficient of a member of 2nd-order of x and 1st-order of y in the polynomial formula.

Numerical Example 1

Regarding the optical system of numerical example 1 (corresponding to example 1), Table 1 shows lens data, Table 2 shows aspherical surface shape data of the lenses, and Table 3 shows free-form surface shape data of the prism.

TABLE 1

| | Lens data | | | | |
|---|---|---|---|---|---|
| SURFACE NO. | RAD. OF CURVTURE | SURFACE INTERVAL | Nd | vd | N550 |
| 1 REDUC. SIDE (IMG. FORM. ELEMENT) | | 0.000 | | | |
| 2 | ∞ (infinity) | 25.900 | 1.5168 | 64.20 | 1.5185 |
| 3 | ∞ | 17.103 | | | |
| 4 ASP | 23.960 | 11.520 | 1.6580 | 36.87 | 1.6618 |
| 5 ASP | 173.553 | 1.250 | | | |
| 6 | 23.721 | 1.000 | 2.0010 | 29.13 | 2.0083 |
| 7 | 14.400 | 11.000 | 1.4970 | 81.61 | 1.4983 |
| 8 | −32.652 | 1.400 | 2.0007 | 25.46 | 2.0090 |
| 9 | −552.166 | 9.990 | | | |
| 10 | −314.863 | 1.000 | 2.0010 | 29.13 | 2.0083 |
| 11 | 34.837 | 4.100 | 1.6180 | 63.39 | 1.6201 |
| 12 | −70.619 | 20.300 | | | |
| 13 STOP | | 4.500 | | | |
| 14 | 824.850 | 3.900 | 1.8081 | 22.76 | 1.8155 |
| 15 | −51.387 | variable | | | |
| 16 | −34.210 | 1.500 | 1.7292 | 54.67 | 1.7320 |
| 17 | −159.343 | 4.100 | 1.9460 | 17.98 | 1.9569 |
| 18 | −90.228 | 0.400 | | | |
| 19 | 60.310 | 10.900 | 1.5481 | 45.82 | 1.5507 |
| 20 | −119.325 | 0.300 | | | |
| 21 | 48.869 | 14.480 | 1.4970 | 81.61 | 1.4983 |
| 22 | −65.058 | 2.000 | 1.9460 | 17.98 | 1.9569 |
| 23 | 123.600 | variable | | | |
| 24 ASP | 500.000 | 7.980 | 1.9229 | 20.88 | 1.9321 |
| 25 ASP | 122.774 | variable | | | |
| 26 ASP | −1000.000 | 6.600 | 1.6104 | 57.93 | 1.6126 |
| 27 ASP | −179.063 | 9.370 | | | |
| 28 FFS | 42.167 | −24.290 | 1.5400 | 59.46 | 1.5419 |

TABLE 1-continued

Lens data

| | | | | | |
|---|---|---|---|---|---|
| 29 FFS REFL. | −71.071 | −13.290 | 1.5400 | 59.46 | 1.5419 |
| 30 REFL. | ∞ | 16.890 | 1.5400 | 59.46 | 1.5419 |
| 31 FFS | −45.779 | variable | | | |
| 32 MAG. SIDE (SCREEN) | | | | | |

ECCENTRICITY DATA

| SURF. NO. | X | Y | Z | α | β | γ |
|---|---|---|---|---|---|---|
| 1 | 0.000 | −1.300 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 ASP | 0.000 | 0.000 | 0.000 | 0.000 | 0.000 | 0.000 |
| 5 ASP | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 ASP | 0.000 | 0.000 | 0.000 | 0.000 | 0.000 | 0.000 |
| 25 ASP | 0.000 | 0.000 | 0.000 | 0.000 | 0.000 | 0.000 |
| 26 ASP | 0.000 | 0.000 | 0.000 | 0.000 | 0.000 | 0.000 |
| 27 ASP | 0.000 | 0.000 | 0.000 | 0.000 | 0.000 | 0.000 |
| 28 FFS | 0.000 | 0.000 | 0.000 | 0.000 | 0.000 | 0.000 |
| 29 FFS REFL. | 0.000 | −77.380 | 0.000 | −23.450 | 0.000 | 0.000 |
| 30 REFL. | 0.000 | 97.513 | 0.000 | 23.450 | 0.000 | 0.000 |
| 31 FFS | 0.000 | 11.530 | 0.000 | 36.600 | 0.000 | 0.000 |
| 32 | 0.000 | −376.653 | 0.000 | −36.600 | 0.000 | 0.000 |

SIZE OF IMAGE FORMING ELEMENT

| | |
|---|---|
| X | 14.516 |
| Y | 9.072 |
| F-number | 2.50 |

DISPLACEMENT

| SURF. NO. | 150" | 125" | 100" |
|---|---|---|---|
| 15 | 64.610 | 64.275 | 64.089 |
| 23 | 28.480 | 28.748 | 28.759 |
| 25 | 5.100 | 5.167 | 5.342 |
| 31 | 487.825 | 354.800 | 221.500 |

TABLE 2

Aspherical (ASP) shape

| SURF. NO. | 4 | 5 | 24 |
|---|---|---|---|
| Y RAD. OF CURV. | 23.960 | 173.553 | 500.000 |
| CONIC CONST. | −4.7022E−01 | 0.0000E+00 | 0.0000E+00 |
| 4th | 4.3156E−07 | 7.3808E−06 | 1.4192E−05 |
| 6th | −5.1790E−09 | −1.3725E−08 | −1.5026E−08 |
| 8th | 4.0662E−12 | −7.4657E−11 | 1.6139E−11 |
| 10th | −1.1328E−13 | 1.3068E−13 | −1.0561E−14 |

TABLE 2-continued

Aspherical (ASP) shape

| | | | |
|---|---|---|---|
| 12th | −1.9395E−16 | −3.0128E−16 | 1.7798E−18 |
| 14th | 1.5368E−18 | −5.4151E−18 | 1.9731E−21 |
| 16th | −6.2522E−21 | 1.3216E−20 | 8.6819E−25 |
| 18th | 0.0000E+00 | 0.0000E+00 | 0.0000E+00 |

| SURF. NO. | 25 | 26 | 27 |
|---|---|---|---|
| Y RAD. OF CURV. | 122.774 | −1000.000 | −179.063 |
| CONIC CONST. | −2.1757E+01 | 0.0000E+00 | 0.0000E+00 |
| 4th | 3.1323E−06 | −8.7753E−08 | 3.3126E−07 |
| 6th | −5.2708E−09 | 1.1703E−09 | 1.6620E−09 |
| 8th | 3.3919E−12 | 3.4219E−12 | 4.5501E−13 |
| 10th | 3.1707E−15 | 3.2899E−15 | −2.9197E−16 |
| 12th | −6.7312E−18 | −4.5968E−19 | 3.9051E−18 |
| 14th | 7.3714E−21 | −4.9760E−22 | 2.3443E−21 |
| 16th | 1.0655E−24 | 2.9521E−24 | −6.6118E−25 |
| 18th | 0.0000E+00 | −9.4296E−28 | −6.8668E−27 |

TABLE 3

Free-form surface (FFS) shape

| SURFACE NO. | 28 | 29 | 31 |
|---|---|---|---|
| Y RAD. OF CURV. | 42.167 | −71.071 | −45.779 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −2.3227E−02 | 3.4910E−03 | 8.0921E−04 |
| X * Y | 0.0000E+00 | 0.0000E+00 | 0.0000E+00 |
| Y**2 | −1.6757E−02 | 1.6171E−02 | −3.0578E−04 |
| X**3 | 0.0000E+00 | 0.0000E+00 | 0.0000E+00 |
| X**2 * Y | −2.7436E−04 | −1.5445E−05 | −3.7987E−05 |
| X Y**2 | 0.0000E+00 | 0.0000E+00 | 0.0000E+00 |
| Y**3 | 2.2761E−04 | −2.0314E−04 | −6.6502E−05 |
| X**4 | 6.1467E−05 | −8.2937E−07 | 2.1514E−08 |
| X**3 * Y | 0.0000E+00 | 0.0000E+00 | 0.0000E+00 |
| X**2 * Y**2 | 1.4486E−05 | −3.9486E−06 | −1.6068E−06 |
| X * Y**3 | 0.0000E+00 | 0.0000E+00 | 0.0000E+00 |
| Y**4 | 8.3263E−06 | 3.2574E−06 | −9.0398E−07 |
| X**5 | 0.0000E+00 | 0.0000E+00 | 0.0000E+00 |
| X**4 * Y | 3.0473E−06 | −6.1856E−11 | −7.8296E−09 |
| X**3 * Y**2 | 0.0000E+00 | 0.0000E+00 | 0.0000E+00 |
| X**2 * Y**3 | −1.8257E−06 | 4.8268E−08 | 1.4669E−08 |
| X * Y**4 | 0.0000E+00 | 0.0000E+00 | 0.0000E+00 |
| Y**5 | −3.9293E−07 | −2.1878E−08 | −2.6332E−08 |
| X**6 | −2.4088E−07 | −4.4056E−09 | −1.6914E−10 |
| X**5 * Y | 0.0000E+00 | 0.0000E+00 | 0.0000E+00 |
| X**4 * Y**2 | −3.1905E−07 | 1.9652E−09 | −2.8604E−10 |
| X**3 * Y**3 | 0.0000E+00 | 0.0000E+00 | 0.0000E+00 |
| X**2 * Y**4 | −1.0764E−07 | 2.9257E−10 | −4.0405E−10 |
| X * Y**5 | 0.0000E+00 | 0.0000E+00 | 0.0000E+00 |
| Y**6 | −2.0078E−08 | −1.4417E−11 | 9.4215E−10 |
| X**7 | 0.0000E+00 | 0.0000E+00 | 0.0000E+00 |
| X**6 * Y | −1.4528E−08 | 5.8376E−11 | −2.0978E−11 |
| X**5 * Y**2 | 0.0000E+00 | 0.0000E+00 | 0.0000E+00 |
| X**4 * Y**3 | −2.2985E−08 | −6.1511E−11 | −8.0067E−11 |
| X**3 * Y**4 | 0.0000E+00 | 0.0000E+00 | 0.0000E+00 |
| X**2 * Y**5 | 5.7129E−09 | 1.3020E−12 | 0.0000E+00 |
| X * Y**6 | 0.0000E+00 | 0.0000E+00 | 0.0000E+00 |
| Y**7 | 9.2513E−10 | 6.4071E−13 | 0.0000E+00 |
| X**8 | 2.3020E−10 | −4.3711E−12 | 0.0000E+00 |
| X**7 * Y | 0.0000E+00 | 0.0000E+00 | 0.0000E+00 |
| X**6 * Y**2 | −3.6799E−10 | 1.9493E−13 | 0.0000E+00 |
| X**5 * Y**3 | 0.0000E+00 | 0.0000E+00 | 0.0000E+00 |
| X**4 * Y**4 | −7.1765E−10 | 9.6946E−13 | 0.0000E+00 |
| X**3 * Y**5 | 0.0000E+00 | 0.0000E+00 | 0.0000E+00 |
| X**2 * Y**6 | 1.5466E−10 | −3.6367E−13 | 0.0000E+00 |
| X * Y**7 | 0.0000E+00 | 0.0000E+00 | 0.0000E+00 |
| Y**8 | 6.8585E−12 | 1.4978E−15 | 0.0000E+00 |
| X**9 | 0.0000E+00 | 0.0000E+00 | 0.0000E+00 |
| X**8 * Y | −8.8683E−13 | 1.0353E−13 | 0.0000E+00 |

TABLE 3-continued

Free-form surface (FFS) shape

| SURFACE NO. | 28 | 29 | 31 |
|---|---|---|---|
| $X^{**}7 * Y^{**}2$ | 0.0000E+00 | 0.0000E+00 | 0.0000E+00 |
| $X^{**}6 * Y^{**}3$ | −1.0835E−12 | 2.3213E−14 | 0.0000E+00 |
| $X^{**}5 * Y^{**}4$ | 0.0000E+00 | 0.0000E+00 | 0.0000E+00 |
| $X^{**}4 * Y^{**}5$ | 2.0774E−13 | −9.0412E−15 | 0.0000E+00 |
| $X^{**}3 * Y^{**}6$ | 0.0000E+00 | 0.0000E+00 | 0.0000E+00 |
| $X^{**}2 * Y^{**}7$ | −8.8748E−14 | 4.4286E−15 | 0.0000E+00 |
| $X * Y^{**}8$ | 0.0000E+00 | 0.0000E+00 | 0.0000E+00 |
| $Y^{**}9$ | −1.1771E−14 | −2.1709E−17 | 0.0000E+00 |
| $X^{**}10$ | 1.7731E−14 | −7.6362E−15 | 0.0000E+00 |
| $X^{**}9 * Y$ | 0.0000E+00 | 0.0000E+00 | 0.0000E+00 |
| $X^{**}8 * Y^{**}2$ | −9.1400E−14 | 1.4007E−15 | 0.0000E+00 |
| $X^{**}7 * Y^{**}3$ | 0.0000E+00 | 0.0000E+00 | 0.0000E+00 |
| $X^{**}6 * Y^{**}4$ | 7.6790E−14 | −5.4798E−16 | 0.0000E+00 |
| $X^{**}5 * Y^{**}5$ | 0.0000E+00 | 0.0000E+00 | 0.0000E+00 |
| $X^{**}4 * Y^{**}6$ | −3.4014E−14 | 6.5204E−17 | 0.0000E+00 |
| $X^{**}3 * Y^{**}7$ | 0.0000E+00 | 0.0000E+00 | 0.0000E+00 |
| $X^{**}2 * Y^{**}8$ | 4.7637E−15 | −1.5416E−17 | 0.0000E+00 |
| $X * Y^{**}9$ | 0.0000E+00 | 0.0000E+00 | 0.0000E+00 |
| $Y^{**}10$ | 4.4601E−18 | −3.1192E−20 | 0.0000E+00 |

Numerical Example 2

Regarding the optical system of numerical example 2 (corresponding to example 2), Table 4 shows lens data, Table 5 shows aspherical surface shape data of the lenses, and Table 6 shows free-form surface shape data of the prism.

TABLE 4

Lens data

| SURFACE NO. | RAD. OF CURVTURE | SURFACE INTERVAL | Nd | vd | N550 |
|---|---|---|---|---|---|
| 1 REDUC. SIDE (IMG. FORM. ELEMENT) | | 0.000 | | | |
| 2 | ∞ (infinity) | 25.900 | 1.5168 | 64.20 | 1.5185 |
| 3 | ∞ | 13.638 | | | |
| 4 ASP | 17.060 | 10.000 | 1.6180 | 63.39 | 1.6201 |
| 5 ASP | 80.120 | variable | | | |
| 6 | 15.090 | 0.700 | 2.0010 | 29.13 | 2.0083 |
| 7 | 9.920 | 11.400 | 1.4970 | 81.61 | 1.4983 |
| 8 | −20.371 | 0.700 | 1.9538 | 32.32 | 1.9600 |
| 9 | 963.890 | variable | | | |
| 10 | −152.245 | 0.700 | 2.0010 | 29.13 | 2.0083 |
| 11 | 22.793 | 4.400 | 1.5673 | 42.84 | 1.5701 |
| 12 | −48.810 | 14.000 | | | |
| 13 STOP | | 1.100 | | | |
| 14 | 378.131 | 9.000 | 1.8467 | 23.78 | 1.8542 |
| 15 | −33.560 | 33.190 | | | |
| 16 | −19.195 | 1.200 | 1.7725 | 49.62 | 1.7758 |
| 17 | −65.610 | 0.300 | | | |
| 18 | 39.045 | 6.000 | 1.5814 | 40.89 | 1.5845 |
| 19 | −132.990 | 6.240 | | | |
| 20 | 29.455 | 12.400 | 1.4370 | 95.10 | 1.4380 |
| 21 | −36.800 | 1.500 | 2.0027 | 19.32 | 2.0136 |
| 22 | 214.536 | variable | | | |
| 23 ASP | −768.012 | 9.000 | 1.9212 | 23.96 | 1.9293 |
| 24 ASP | 44.630 | 2.800 | | | |
| 25 | 57.218 | 8.500 | 1.6204 | 60.34 | 1.6226 |
| 26 | −47.834 | variable | | | |
| 27 FFS | 81.710 | −30.763 | 1.5300 | 55.84 | 1.5320 |
| 28 FFS | −48.193 | −19.382 | 1.5300 | 55.84 | 1.5320 |
| 29 FFS REFL. | ∞ | 13.566 | 1.5300 | 55.84 | 1.5320 |
| 30 REFL. | −29.511 | variable | | | |
| 31 MAG. SIDE (SCREEN) | | | | | |

TABLE 4-continued

Lens data

| SURF. NO. | ECCENTRICITY DATA | | | | | |
|---|---|---|---|---|---|---|
| | X | Y | Z | α | β | γ |
| 1 | 0.000 | −2.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 ASP | 0.000 | 0.000 | 0.000 | 0.000 | 0.000 | 0.000 |
| 5 ASP | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 STOP | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 ASP | 0.000 | 0.000 | 0.000 | 0.000 | 0.000 | 0.000 |
| 24 ASP | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 FFS | 0.000 | 0.000 | 0.000 | 0.000 | 0.000 | 0.000 |
| 28 FFS | 0.000 | −47.380 | 0.000 | −48.770 | 0.000 | 0.000 |
| 29 FFS REFL. | 0.000 | 79.600 | 0.000 | 2.620 | 0.000 | 0.000 |
| 30 REFL. | 0.000 | −1.580 | 0.000 | 37.910 | 0.000 | 0.000 |
| 31 | 0.000 | −261.015 | 0.000 | −81.762 | 0.000 | 0.000 |

SIZE OF IMAGE FORMING ELEMENT

| X | 10.588 |
|---|---|
| Y | 5.956 |
| F-number | 2.80 |

DISPLACEMENT

| SURF. NO. | 100" | 80" | 60" |
|---|---|---|---|
| 5 | 1.428 | 1.500 | 1.566 |
| 9 | 2.682 | 2.610 | 2.544 |
| 22 | 22.145 | 22.040 | 21.837 |
| 26 | 2.895 | 3.000 | 3.203 |
| 30 | 890.000 | 337.739 | −212.800 |

TABLE 5

Aspherical (ASP) shape

| SURF. NO. | 4 | 5 | 23 | 24 |
|---|---|---|---|---|
| Y RAD. OF CURV. | 17.060 | 80.120 | −768.012 | 44.630 |
| CONIC CONST. | −4.3827E−01 | 0.0000E+00 | 0.0000E+00 | 1.7682E+00 |
| 4th | 4.4126E−06 | 2.3059E−05 | 5.7493E−05 | 1.9949E−05 |
| 6th | −1.4161E−08 | −1.3206E−08 | −1.5100E−07 | −6.9656E−08 |
| 8th | 1.5349E−11 | −9.5211E−10 | 3.9099E−10 | 1.9160E−10 |
| 10th | 6.9128E−14 | 3.4350E−12 | −5.9278E−13 | 2.8521E−13 |
| 12th | −1.2152E−14 | 6.7620E−15 | 3.6158E−16 | −1.4532E−15 |
| 14th | 9.0561E−17 | −2.3105E−16 | 2.1397E−19 | 6.0833E−19 |
| 16th | −3.0077E−19 | 7.0088E−19 | −2.6529E−22 | 2.7249E−21 |
| 18th | 0.0000E+00 | 0.0000E+00 | 0.0000E+00 | 0.0000E+00 |

TABLE 6

Free-form surface (FFS) shape

| SURFACE NO. | 27 | 28 | 29 |
|---|---|---|---|
| Y RAD. OF CURV. | 81.710 | −48.193 | −29.511 |
| CONIC CONST. | 0.0000E+00 | −5.9097E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | 0.0000E+00 | 4.2163E−03 | 0.0000E+00 |
| X * Y | 0.0000E+00 | 0.0000E+00 | 0.0000E+00 |
| Y**2 | −3.7834E−03 | 2.3559E−02 | −1.8646E−03 |
| X**3 | 0.0000E+00 | 0.0000E+00 | 0.0000E+00 |
| X**2 * Y | −4.5061E−04 | −3.7905E−05 | −4.4431E−06 |
| X Y**2 | 0.0000E+00 | 0.0000E+00 | 0.0000E+00 |
| Y**3 | −2.4864E−04 | −5.3760E−04 | 2.8952E−06 |
| X**4 | 2.9601E−05 | −1.8075E−06 | −3.2490E−07 |
| X**3 * Y | 0.0000E+00 | 0.0000E+00 | 0.0000E+00 |
| X**2 * Y**2 | −9.5001E−06 | −1.5516E−05 | 8.9302E−07 |
| X * Y**3 | 0.0000E+00 | 0.0000E+00 | 0.0000E+00 |
| Y**4 | −2.1195E−06 | 1.2656E−05 | 2.4827E−06 |
| X**5 | 0.0000E+00 | 0.0000E+00 | 0.0000E+00 |
| X**4 * Y | 9.2859E−07 | 4.1627E−08 | −2.2883E−08 |
| X**3 * Y**2 | 0.0000E+00 | 0.0000E+00 | 0.0000E+00 |
| X**2 * Y**3 | 8.0312E−07 | 3.1675E−07 | 1.7533E−07 |
| X * Y**4 | 0.0000E+00 | 0.0000E+00 | 0.0000E+00 |
| Y**5 | −4.0581E−07 | −1.3957E−07 | 3.1900E−08 |
| X**6 | −3.1116E−07 | −4.8925E−08 | 7.9375E−10 |
| X**5 * Y | 0.0000E+00 | 0.0000E+00 | 0.0000E+00 |
| X**4 * Y**2 | −7.6025E−07 | 1.9347E−08 | 1.0228E−09 |
| X**3 * Y**3 | 0.0000E+00 | 0.0000E+00 | 0.0000E+00 |
| X**2 * Y**4 | −4.1987E−07 | 3.0593E−09 | 8.0796E−09 |
| X * Y**5 | 0.0000E+00 | 0.0000E+00 | 0.0000E+00 |
| Y**6 | −1.5297E−07 | −1.3543E−10 | 1.4515E−10 |
| X**7 | 0.0000E+00 | 0.0000E+00 | 0.0000E+00 |
| X**6 * Y | −7.1286E−09 | 9.0594E−10 | −1.5908E−12 |
| X**5 * Y**2 | 0.0000E+00 | 0.0000E+00 | 0.0000E+00 |
| X**4 * Y**3 | −1.5597E−08 | −1.0348E−09 | 1.1618E−10 |
| X**3 * Y**4 | 0.0000E+00 | 0.0000E+00 | 0.0000E+00 |
| X**2 * Y**5 | −1.4393E−09 | 4.9343E−11 | 0.0000E+00 |
| X * Y**6 | 0.0000E+00 | 0.0000E+00 | 0.0000E+00 |
| Y**7 | 6.7106E−10 | 1.0754E−11 | 0.0000E+00 |
| X**8 | 2.8747E−10 | −1.7991E−10 | 0.0000E+00 |
| X**7 * Y | 0.0000E+00 | 0.0000E+00 | 0.0000E+00 |
| X**6 * Y**2 | 7.7759E−10 | 5.7596E−12 | 0.0000E+00 |
| X**5 * Y**3 | 0.0000E+00 | 0.0000E+00 | 0.0000E+00 |
| X**4 * Y**4 | 6.6699E−10 | 2.3734E−11 | 0.0000E+00 |
| X**3 * Y**5 | 0.0000E+00 | 0.0000E+00 | 0.0000E+00 |
| X**2 * Y**6 | 3.0014E−10 | −8.6300E−12 | 0.0000E+00 |
| X * Y**7 | 0.0000E+00 | 0.0000E+00 | 0.0000E+00 |
| Y**8 | 9.4282E−11 | 5.5794E−14 | 0.0000E+00 |
| X**9 | 0.0000E+00 | 0.0000E+00 | 0.0000E+00 |
| X**8 * Y | 0.0000E+00 | 7.0212E−13 | 0.0000E+00 |
| X**7 * Y**2 | 0.0000E+00 | 0.0000E+00 | 0.0000E+00 |
| X**6 * Y**3 | 0.0000E+00 | 1.1197E−12 | 0.0000E+00 |
| X**5 * Y**4 | 0.0000E+00 | 0.0000E+00 | 0.0000E+00 |
| X**4 * Y**5 | 0.0000E+00 | −3.8515E−13 | 0.0000E+00 |
| X**3 * Y**6 | 0.0000E+00 | 0.0000E+00 | 0.0000E+00 |
| X**2 * Y**7 | 0.0000E+00 | 1.7608E−13 | 0.0000E+00 |
| X * Y**8 | 0.0000E+00 | 0.0000E+00 | 0.0000E+00 |
| Y**9 | 0.0000E+00 | −6.4324E−16 | 0.0000E+00 |
| X**10 | 0.0000E+00 | −5.8693E−14 | 0.0000E+00 |
| X**9 * Y | 0.0000E+00 | 0.0000E+00 | 0.0000E+00 |
| X**8 * Y**2 | 0.0000E+00 | 4.7781E−14 | 0.0000E+00 |
| X**7 * Y**3 | 0.0000E+00 | 0.0000E+00 | 0.0000E+00 |
| X**6 * Y**4 | 0.0000E+00 | −2.2445E−14 | 0.0000E+00 |
| X**5 * Y**5 | 0.0000E+00 | 0.0000E+00 | 0.0000E+00 |
| X**4 * Y**6 | 0.0000E+00 | 3.2578E−15 | 0.0000E+00 |
| X**3 * Y**7 | 0.0000E+00 | 0.0000E+00 | 0.0000E+00 |
| X**2 * Y**8 | 0.0000E+00 | −1.1615E−15 | 0.0000E+00 |
| X * Y**9 | 0.0000E+00 | 0.0000E+00 | 0.0000E+00 |
| Y**10 | 0.0000E+00 | −2.7341E−18 | 0.0000E+00 |

Numerical Example 3

Regarding the optical system of numerical example 3 (corresponding to example 3), Table 7 shows lens data, Table 8 shows aspherical surface shape data of the lenses, and Table 9 shows free-form surface shape data of the prism.

TABLE 7

Lens data

| SURFACE NO. | RAD. OF CURVTURE | SURFACE INTERVAL | Nd | νd | N550 |
|---|---|---|---|---|---|
| 1 REDUC. SIDE (IMG. FORM. ELEMENT) | | 0.000 | | | |
| 2 | ∞ (infinity) | 25.900 | 1.5168 | 64.20 | 1.5185 |
| 3 | ∞ | 17.103 | | | |
| 4 ASP | 23.930 | 11.520 | 1.6580 | 36.87 | 1.6618 |
| 5 ASP | 173.550 | 1.250 | | | |
| 6 | 23.741 | 1.000 | 2.0010 | 29.13 | 2.0083 |
| 7 | 14.400 | 11.000 | 1.4970 | 81.61 | 1.4983 |
| 8 | −32.652 | 1.400 | 2.0007 | 25.46 | 2.0090 |
| 9 | −559.196 | 9.990 | | | |
| 10 | −312.402 | 1.000 | 2.0010 | 29.13 | 2.0083 |
| 11 | 34.837 | 4.100 | 1.6180 | 63.39 | 1.6201 |

TABLE 7-continued

| Lens data | | | | | |
|---|---|---|---|---|---|
| 12 | −70.875 | 20.300 | | | |
| 13 STOP | 4.500 | | | | |
| 14 | 827.441 | 3.900 | 1.8081 | 22.76 | 1.8155 |
| 15 | −51.369 | variable | | | |
| 16 | −34.395 | 1.500 | 1.7292 | 54.67 | 1.7320 |
| 17 | −159.343 | 4.100 | 1.9460 | 17.98 | 1.9569 |
| 18 | −90.401 | 0.400 | | | |
| 19 | 60.646 | 10.900 | 1.5481 | 45.82 | 1.5507 |
| 20 | −118.434 | 0.300 | | | |
| 21 | 48.595 | 14.480 | 1.4970 | 81.61 | 1.4983 |
| 22 | −65.058 | 2.000 | 1.9460 | 17.98 | 1.9569 |
| 23 | 122.588 | variable | | | |
| 24 ASP | 467.714 | 7.980 | 1.9229 | 20.88 | 1.9321 |
| 25 ASP | 126.596 | variable | | | |
| 26 ASP | −964.988 | 6.600 | 1.6104 | 57.93 | 1.6126 |
| 27 ASP | −178.108 | 9.370 | | | |
| 28 FFS | 42.265 | −24.290 | 1.5400 | 59.46 | 1.5419 |
| 29 FFS REFL. | −71.074 | −33.373 | 1.5400 | 59.46 | 1.5419 |
| 30 FFS | 45.666 | variable | | | |
| 31 MAG. SIDE (SCREEN) | | | | | |

| SURF. NO. | ECCENTRICITY DATA | | | | | |
|---|---|---|---|---|---|---|
| | X | Y | Z | α | β | γ |
| 1 | 0.0000 | −1.3000 | 0.0000 | 0.0000 | 0.0000 | 0.0000 |
| 2 | 0.0000 | 0.0000 | 0.0000 | 0.0000 | 0.0000 | 0.0000 |
| 3 | 0.0000 | 0.0000 | 0.0000 | 0.0000 | 0.0000 | 0.0000 |
| 4 ASP | 0.0000 | 0.0000 | 0.0000 | 0.0000 | 0.0000 | 0.0000 |
| 5 ASP | 0.0000 | 0.0000 | 0.0000 | 0.0000 | 0.0000 | 0.0000 |
| 6 | 0.0000 | 0.0000 | 0.0000 | 0.0000 | 0.0000 | 0.0000 |
| 7 | 0.0000 | 0.0000 | 0.0000 | 0.0000 | 0.0000 | 0.0000 |
| 8 | 0.0000 | 0.0000 | 0.0000 | 0.0000 | 0.0000 | 0.0000 |
| 9 | 0.0000 | 0.0000 | 0.0000 | 0.0000 | 0.0000 | 0.0000 |
| 10 | 0.0000 | 0.0000 | 0.0000 | 0.0000 | 0.0000 | 0.0000 |
| 11 | 0.0000 | 0.0000 | 0.0000 | 0.0000 | 0.0000 | 0.0000 |
| 12 | 0.0000 | 0.0000 | 0.0000 | 0.0000 | 0.0000 | 0.0000 |
| 13 STOP | 0.0000 | 0.0000 | 0.0000 | 0.0000 | 0.0000 | 0.0000 |
| 14 | 0.0000 | 0.0000 | 0.0000 | 0.0000 | 0.0000 | 0.0000 |
| 15 | 0.0000 | 0.0000 | 0.0000 | 0.0000 | 0.0000 | 0.0000 |
| 16 | 0.0000 | 0.0000 | 0.0000 | 0.0000 | 0.0000 | 0.0000 |
| 17 | 0.0000 | 0.0000 | 0.0000 | 0.0000 | 0.0000 | 0.0000 |
| 18 | 0.0000 | 0.0000 | 0.0000 | 0.0000 | 0.0000 | 0.0000 |
| 19 | 0.0000 | 0.0000 | 0.0000 | 0.0000 | 0.0000 | 0.0000 |
| 20 | 0.0000 | 0.0000 | 0.0000 | 0.0000 | 0.0000 | 0.0000 |
| 21 | 0.0000 | 0.0000 | 0.0000 | 0.0000 | 0.0000 | 0.0000 |
| 22 | 0.0000 | 0.0000 | 0.0000 | 0.0000 | 0.0000 | 0.0000 |
| 23 | 0.0000 | 0.0000 | 0.0000 | 0.0000 | 0.0000 | 0.0000 |
| 24 ASP | 0.0000 | 0.0000 | 0.0000 | 0.0000 | 0.0000 | 0.0000 |
| 25 ASP | 0.0000 | 0.0000 | 0.0000 | 0.0000 | 0.0000 | 0.0000 |
| 26 ASP | 0.0000 | 0.0000 | 0.0000 | 0.0000 | 0.0000 | 0.0000 |
| 27 ASP | 0.0000 | 0.0000 | 0.0000 | 0.0000 | 0.0000 | 0.0000 |
| 28 FFS | 0.0000 | 0.0000 | 0.0000 | 0.0000 | 0.0000 | 0.0000 |
| 29 FFS REFL. | 0.0000 | −77.3800 | 0.0000 | −23.4500 | 0.0000 | 0.0000 |
| 30 FFS | 0.0000 | 101.3694 | 0.0000 | −13.1500 | 0.0000 | 0.0000 |
| 31 | 0.0000 | −388.8645 | 0.0000 | 36.6000 | 0.0000 | 0.0000 |

TABLE 7-continued

Lens data

SIZE OF IMAGE FORMING ELEMENT

| | |
|---|---|
| X | 14.516 |
| Y | 9.072 |
| F-number | 2.50 |

DISPLACEMENT

| SURF. NO. | 150″ | 125″ | 100″ |
|---|---|---|---|
| 15 | 64.610 | 64.322 | 64.149 |
| 23 | 28.480 | 28.699 | 28.704 |
| 25 | 5.100 | 5.169 | 5.337 |
| 31 | −504.000 | −367.000 | −229.700 |

TABLE 8

Aspherical (ASP) shape

| SURF. NO. | 4 | 5 | 24 |
|---|---|---|---|
| Y RAD. OF CURV. | 23.930 | 173.550 | 467.714 |
| CONIC CONST. | −4.7040E−01 | 0.0000E+00 | 0.0000E+00 |
| 4th | 4.3332E−07 | 7.3910E−06 | 1.4181E−05 |
| 6th | −5.2299E−09 | −1.3721E−08 | −1.5031E−08 |
| 8th | 4.0353E−12 | −7.4701E−11 | 1.6141E−11 |
| 10th | −1.1308E−13 | 1.3079E−13 | −1.0558E−14 |
| 12th | −1.9308E−16 | −2.9973E−16 | 1.7820E−18 |
| 14th | 1.5390E−18 | −5.4098E−18 | 1.9746E−21 |
| 16th | −6.2475E−21 | 1.3204E−20 | 8.6988E−25 |
| 18th | 0.0000E+00 | 0.0000E+00 | 0.0000E+00 |

| SURF. NO. | 25 | 26 | 27 |
|---|---|---|---|
| Y RAD. OF CURV. | 126.596 | −964.988 | −178.108 |
| CONIC CONST. | −1.9862E+01 | 0.0000E+00 | 0.0000E+00 |
| 4th | 3.1555E−06 | −1.3757E−07 | 3.4295E−07 |
| 6th | −5.3284E−09 | 1.2908E−09 | 1.6866E−09 |
| 8th | 3.4047E−12 | 3.3829E−12 | 4.6620E−13 |
| 10th | 3.1724E−15 | 3.2851E−15 | −2.9710E−16 |
| 12th | −6.7184E−18 | −4.9206E−19 | 3.8858E−18 |
| 14th | 7.3850E−21 | −5.4858E−22 | 2.3066E−21 |
| 16th | 1.0627E−24 | 2.9560E−24 | −7.4248E−25 |
| 18th | 0.0000E+00 | −7.6209E−28 | −7.0748E−27 |

TABLE 9

Free-form surface (FFS) shape

| SURFACE NO. | 28 | 29 | 30 |
|---|---|---|---|
| Y RAD. OF CURV. | 42.265 | −71.074 | 45.666 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| $X^{**}2$ | −2.3186E−02 | 3.4878E−03 | −8.0092E−04 |
| $X*Y$ | 0.0000E+00 | 0.0000E+00 | 0.0000E+00 |
| $Y^{**}2$ | −1.6771E−02 | 1.6168E−02 | 3.2245E−04 |
| $X^{**}3$ | 0.0000E+00 | 0.0000E+00 | 0.0000E+00 |
| $X^{**}2*Y$ | −2.7465E−04 | −1.5428E−05 | 3.9531E−05 |
| $X\,Y^{**}2$ | 0.0000E+00 | 0.0000E+00 | 0.0000E+00 |
| $Y^{**}3$ | 2.2596E−04 | −2.0327E−04 | 6.7716E−05 |
| $X^{**}4$ | 6.2496E−05 | −8.5092E−07 | −2.1511E−08 |
| $X^{**}3*Y$ | 0.0000E+00 | 0.0000E+00 | 0.0000E+00 |
| $X^{**}2*Y^{**}2$ | 1.4612E−05 | −3.9454E−06 | 1.5553E−06 |
| $X*Y^{**}3$ | 0.0000E+00 | 0.0000E+00 | 0.0000E+00 |
| $Y^{**}4$ | 8.4165E−06 | 3.2555E−06 | 8.2897E−07 |

TABLE 9-continued

Free-form surface (FFS) shape

| SURFACE NO. | 28 | 29 | 30 |
|---|---|---|---|
| $X^{**}5$ | 0.0000E+00 | 0.0000E+00 | 0.0000E+00 |
| $X^{**}4*Y$ | 3.0153E−06 | −2.5629E−10 | 8.5673E−09 |
| $X^{**}3*Y^{**}2$ | 0.0000E+00 | 0.0000E+00 | 0.0000E+00 |
| $X^{**}2*Y^{**}3$ | −1.8219E−06 | 4.8325E−08 | −1.4379E−08 |
| $X*Y^{**}4$ | 0.0000E+00 | 0.0000E+00 | 0.0000E+00 |
| $Y^{**}5$ | −3.9641E−07 | −2.1893E−08 | 2.2504E−08 |
| $X^{**}6$ | −2.4234E−07 | −4.4683E−09 | 1.5191E−10 |
| $X^{**}5*Y$ | 0.0000E+00 | 0.0000E+00 | 0.0000E+00 |
| $X^{**}4*Y^{**}2$ | −3.1772E−07 | 1.9646E−09 | 2.7256E−10 |
| $X^{**}3*Y^{**}3$ | 0.0000E+00 | 0.0000E+00 | 0.0000E+00 |
| $X^{**}2*Y^{**}4$ | −1.0816E−07 | 2.9316E−10 | 6.3586E−10 |
| $X*Y^{**}5$ | 0.0000E+00 | 0.0000E+00 | 0.0000E+00 |
| $Y^{**}6$ | −1.9963E−08 | −1.4515E−11 | −9.3526E−10 |
| $X^{**}7$ | 0.0000E+00 | 0.0000E+00 | 0.0000E+00 |
| $X^{**}6*Y$ | −1.4582E−08 | 5.8345E−11 | 2.1111E−11 |
| $X^{**}5*Y^{**}2$ | 0.0000E+00 | 0.0000E+00 | 0.0000E+00 |
| $X^{**}4*Y^{**}3$ | −2.3025E−08 | −6.1514E−11 | 7.2089E−11 |
| $X^{**}3*Y^{**}4$ | 0.0000E+00 | 0.0000E+00 | 0.0000E+00 |
| $X^{**}2*Y^{**}5$ | 5.7390E−09 | 1.3057E−12 | −2.4001E−12 |
| $X*Y^{**}6$ | 0.0000E+00 | 0.0000E+00 | 0.0000E+00 |
| $Y^{**}7$ | 9.2275E−10 | 6.4014E−13 | −6.8477E−13 |
| $X^{**}8$ | 2.2072E−10 | −4.4499E−12 | 5.8417E−16 |
| $X^{**}7*Y$ | 0.0000E+00 | 0.0000E+00 | 0.0000E+00 |
| $X^{**}6*Y^{**}2$ | −3.6973E−10 | 1.9882E−13 | 2.6514E−14 |
| $X^{**}5*Y^{**}3$ | 0.0000E+00 | 0.0000E+00 | 0.0000E+00 |
| $X^{**}4*Y^{**}4$ | −7.1561E−10 | 9.6946E−13 | 2.2191E−13 |
| $X^{**}3*Y^{**}5$ | 0.0000E+00 | 0.0000E+00 | 0.0000E+00 |
| $X^{**}2*Y^{**}6$ | 1.5355E−10 | −3.6367E−13 | −2.0545E−14 |
| $X*Y^{**}7$ | 0.0000E+00 | 0.0000E+00 | 0.0000E+00 |
| $Y^{**}8$ | 6.7786E−12 | 1.4964E−15 | 8.2991E−14 |
| $X^{**}9$ | 0.0000E+00 | 0.0000E+00 | 0.0000E+00 |
| $X^{**}8*Y$ | −9.6096E−13 | 1.0442E−13 | −7.1535E−16 |
| $X^{**}7*Y^{**}2$ | 0.0000E+00 | 0.0000E+00 | 0.0000E+00 |
| $X^{**}6*Y^{**}3$ | −9.3751E−13 | 2.3303E−14 | −4.0309E−15 |
| $X^{**}5*Y^{**}4$ | 0.0000E+00 | 0.0000E+00 | 0.0000E+00 |
| $X^{**}4*Y^{**}5$ | 2.3400E−14 | −9.0416E−15 | −3.7781E−15 |
| $X^{**}3*Y^{**}6$ | 0.0000E+00 | 0.0000E+00 | 0.0000E+00 |
| $X^{**}2*Y^{**}7$ | −2.2620E−14 | 4.4284E−15 | −2.7684E−14 |
| $X*Y^{**}8$ | 0.0000E+00 | 0.0000E+00 | 0.0000E+00 |
| $Y^{**}9$ | 3.3707E−15 | −2.1678E−17 | 1.2251E−15 |
| $X^{**}10$ | 1.7312E−14 | −7.5122E−15 | 1.6482E−17 |
| $X^{**}9*Y$ | 0.0000E+00 | 0.0000E+00 | 0.0000E+00 |
| $X^{**}8*Y^{**}2$ | −1.8995E−13 | 1.4264E−15 | 2.6618E−17 |
| $X^{**}7*Y^{**}3$ | 0.0000E+00 | 0.0000E+00 | 0.0000E+00 |
| $X^{**}6*Y^{**}4$ | 8.1565E−14 | −5.4659E−16 | −7.0883E−16 |
| $X^{**}5*Y^{**}5$ | 0.0000E+00 | 0.0000E+00 | 0.0000E+00 |
| $X^{**}4*Y^{**}6$ | −1.9002E−14 | 6.5193E−17 | −3.6114E−16 |
| $X^{**}3*Y^{**}7$ | 0.0000E+00 | 0.0000E+00 | 0.0000E+00 |
| $X^{**}2*Y^{**}8$ | −1.4307E−15 | −1.5418E−17 | −1.0264E−15 |
| $X*Y^{**}9$ | 0.0000E+00 | 0.0000E+00 | 0.0000E+00 |
| $Y^{**}10$ | −1.3015E−15 | −3.0468E−20 | 1.4001E−16 |

Numerical Example 4

Regarding the optical system of numerical example 4 (corresponding to example 4), Table 10 shows lens data, and Table 11 shows free-form surface shape data of the prism. Only in Example 4 the lens data show absolute (global) coordinates based on the first surface.

TABLE 10

Lens data

| SURFACE NO. | RAD. OF CURVTURE | Nd | vd | N550 |
|---|---|---|---|---|
| 1 REDUC. SIDE (IMG. FORM. ELEMENT) | | | | |
| 2 | 12.287 | 1.6584 | 50.85 | 1.6612 |
| 3 | −25.540 | | | |
| 4 | −6.823 | 1.7433 | 49.22 | 1.7465 |
| 5 | −7.353 | | | |
| 6 | −9.625 | 1.7847 | 25.72 | 1.7911 |
| 7 | −15.319 | | | |
| 8 STOP | | | | |
| 9 FFS | −20.967 | 1.6074 | 27.00 | 1.6120 |
| 10 FFS REFL. | −43.333 | 1.6074 | 27.00 | 1.6120 |
| 11 FFS REFL. | −908.725 | 1.6074 | 27.00 | 1.6120 |
| 12 FFS REFL. | 7214.055 | 1.6074 | 27.00 | 1.6120 |
| 13 FFS | −24.928 | | | |
| 14 FFS | −18.078 | 1.5300 | 55.84 | 1.5320 |
| 15 FFS REFL. | 24.983 | 1.5300 | 55.84 | 1.5320 |
| 16 FFS REFL. | 1519.213 | 1.5300 | 55.84 | 1.5320 |
| 17 FFS | 21.846 | | | |
| 18 MAG. SIDE (SCREEN) | | | | |

| SURF. NO. | GLOBAL COORDINATE BASED ON FIRST SURFACE | | | | | |
|---|---|---|---|---|---|---|
| | X | Y | Z | α | β | γ |
| 1 | 0.000 | 0.000 | 0.000 | 0.000 | 0.000 | 0.000 |
| 2 | 0.000 | −0.980 | 6.880 | 0.000 | 0.000 | 0.000 |
| 3 | 0.000 | −0.980 | 10.079 | 0.000 | 0.000 | 0.000 |
| 4 | 0.000 | −0.980 | 10.762 | 0.000 | 0.000 | 0.000 |
| 5 | 0.000 | −0.980 | 13.823 | 0.000 | 0.000 | 0.000 |
| 6 | 0.000 | −0.980 | 13.923 | 0.000 | 0.000 | 0.000 |
| 7 | 0.000 | −0.980 | 15.127 | 0.000 | 0.000 | 0.000 |
| 8 STOP | 0.000 | −0.980 | 16.127 | 0.000 | 0.000 | 0.000 |
| 9 FFS | 0.000 | −0.980 | 18.127 | 0.000 | 0.000 | 0.000 |
| 10 FFS REFL. | 0.000 | −0.980 | 28.100 | 25.030 | 0.000 | 0.000 |
| 11 FFS REFL. | 0.000 | −12.508 | 18.447 | 0.445 | 0.000 | 0.000 |
| 12 FFS REFL. | 0.000 | −23.391 | 27.850 | −24.466 | 0.000 | 0.000 |
| 13 FFS | 0.000 | −24.187 | 16.616 | 0.238 | 0.000 | 0.000 |
| 14 FFS | 0.000 | −27.233 | 13.629 | 0.238 | 0.000 | 0.000 |
| 15 FFS REFL. | 0.000 | −53.139 | 13.022 | 25.812 | 0.000 | 0.000 |
| 16 FFS REFL. | 0.000 | −52.830 | 13.659 | 15.805 | 0.000 | 0.000 |
| 17 FFS | 0.000 | −12.953 | −4.673 | −25.610 | 0.000 | 0.000 |
| 18 | 0.000 | −73.779 | −192.690 | 30.000 | 0.000 | 0.000 |

| SIZE OF IMAGE FORMING ELEMENT | |
|---|---|
| X | 6.912 |
| Y | 3.880 |
| F-number | 2.50 |

TABLE 11

Free-form surface (FFS) shape

| SURFACE NO. | 9 | 10 | 11 |
|---|---|---|---|
| Y RAD. OF CURV. | −20.967 | −43.333 | −908.725 |
| CONIC CONST. | 0.0000E+00 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | 2.5338E−03 | −6.9717E−03 | −3.4397E−02 |
| X * Y | 0.0000E+00 | 0.0000E+00 | 0.0000E+00 |
| Y**2 | 2.4814E−03 | −2.1609E−03 | −6.8431E−03 |
| X**3 | 0.0000E+00 | 0.0000E+00 | 0.0000E+00 |
| X**2 * Y | −5.6418E−04 | −3.5034E−05 | 8.4204E−04 |
| X Y**2 | 0.0000E+00 | 0.0000E+00 | 0.0000E+00 |
| Y**3 | −5.3139E−04 | −9.6788E−06 | 3.0342E−04 |
| X**4 | 4.5446E−05 | 6.0747E−06 | 4.9247E−05 |
| X**3 * Y | 0.0000E+00 | 0.0000E+00 | 0.0000E+00 |
| X**2 * Y**2 | 8.0617E−05 | 6.4227E−06 | −4.8427E−05 |
| X * Y**3 | 0.0000E+00 | 0.0000E+00 | 0.0000E+00 |
| Y**4 | 2.6995E−05 | 3.2537E−06 | −3.9760E−06 |
| X**5 | 0.0000E+00 | 0.0000E+00 | 0.0000E+00 |
| X**4 * Y | 0.0000E+00 | 3.3419E−07 | 8.8527E−06 |
| X**3 * Y**2 | 0.0000E+00 | 0.0000E+00 | 0.0000E+00 |
| X**2 * Y**3 | 0.0000E+00 | −3.8864E−08 | −2.7391E−06 |
| X * Y**4 | 0.0000E+00 | 0.0000E+00 | 0.0000E+00 |
| Y**5 | 0.0000E+00 | 2.0063E−07 | 1.7606E−07 |
| X**6 | 0.0000E+00 | 2.9985E−08 | 9.8920E−07 |
| X**5 * Y | 0.0000E+00 | 0.0000E+00 | 0.0000E+00 |
| X**4 * Y**2 | 0.0000E+00 | 1.3137E−07 | 1.3178E−06 |
| X**3 * Y**3 | 0.0000E+00 | 0.0000E+00 | 0.0000E+00 |
| X**2 * Y**4 | 0.0000E+00 | 4.0023E−08 | −3.2412E−07 |
| X * Y**5 | 0.0000E+00 | 0.0000E+00 | 0.0000E+00 |
| Y**6 | 0.0000E+00 | 3.0002E−08 | −7.0897E−08 |
| X**7 | 0.0000E+00 | 0.0000E+00 | 0.0000E+00 |
| X**6 * Y | 0.0000E+00 | −2.2842E−09 | −7.8343E−07 |
| X**5 * Y**2 | 0.0000E+00 | 0.0000E+00 | 0.0000E+00 |
| X**4 * Y**3 | 0.0000E+00 | 1.1316E−08 | −1.5829E−07 |
| X**3 * Y**4 | 0.0000E+00 | 0.0000E+00 | 0.0000E+00 |
| X**2 * Y**5 | 0.0000E+00 | −1.5421E−09 | −3.0587E−08 |
| X * Y**6 | 0.0000E+00 | 0.0000E+00 | 0.0000E+00 |
| Y**7 | 0.0000E+00 | 2.7342E−10 | 1.0688E−08 |
| X**8 | 0.0000E+00 | −2.8114E−10 | −1.1116E−07 |
| X**7 * Y | 0.0000E+00 | 0.0000E+00 | 0.0000E+00 |
| X**6 * Y**2 | 0.0000E+00 | −6.2156E−10 | −1.1414E−07 |
| X**5 * Y**3 | 0.0000E+00 | 0.0000E+00 | 0.0000E+00 |
| X**4 * Y**4 | 0.0000E+00 | 2.1392E−10 | 3.5203E−09 |
| X**3 * Y**5 | 0.0000E+00 | 0.0000E+00 | 0.0000E+00 |
| X**2 * Y**6 | 0.0000E+00 | −3.2857E−10 | 7.6307E−09 |
| X * Y**7 | 0.0000E+00 | 0.0000E+00 | 0.0000E+00 |
| Y**8 | 0.0000E+00 | 2.6756E−11 | 4.8423E−09 |
| X**9 | 0.0000E+00 | 0.0000E+00 | 0.0000E+00 |
| X**8 * Y | 0.0000E+00 | 5.1324E−11 | 1.5675E−08 |
| X**7 * Y**2 | 0.0000E+00 | 0.0000E+00 | 0.0000E+00 |
| X**6 * Y**3 | 0.0000E+00 | −5.3018E−10 | 5.3280E−10 |
| X**5 * Y**4 | 0.0000E+00 | 0.0000E+00 | 0.0000E+00 |
| X**4 * Y**5 | 0.0000E+00 | −4.7320E−10 | −9.0151E−10 |
| X**3 * Y**6 | 0.0000E+00 | 0.0000E+00 | 0.0000E+00 |
| X**2 * Y**7 | 0.0000E+00 | −5.9996E−11 | 1.1109E−10 |
| X * Y**8 | 0.0000E+00 | 0.0000E+00 | 0.0000E+00 |
| Y**9 | 0.0000E+00 | 1.6689E−11 | 4.0676E−10 |
| X**10 | 0.0000E+00 | 1.3092E−11 | 3.3086E−09 |
| X**9 * Y | 0.0000E+00 | 0.0000E+00 | 0.0000E+00 |
| X**8 * Y**2 | 0.0000E+00 | −8.7819E−12 | 2.1475E−09 |
| X**7 * Y**3 | 0.0000E+00 | 0.0000E+00 | 0.0000E+00 |
| X**6 * Y**4 | 0.0000E+00 | −8.4586E−11 | −2.4283E−10 |
| X**5 * Y**5 | 0.0000E+00 | 0.0000E+00 | 0.0000E+00 |
| X**4 * Y**6 | 0.0000E+00 | −4.8887E−11 | −3.7118E−10 |
| X**3 * Y**7 | 0.0000E+00 | 0.0000E+00 | 0.0000E+00 |
| X**2 * Y**8 | 0.0000E+00 | −6.7579E−12 | −4.8846E−11 |
| X * Y**9 | 0.0000E+00 | 0.0000E+00 | 0.0000E+00 |
| Y**10 | 0.0000E+00 | 8.7857E−13 | 1.0070E−11 |

| SURFACE NO. | 12 | 13 | 14 |
|---|---|---|---|
| Y RAD. OF CURV. | 7214.055 | −24.928 | −18.078 |
| CONIC CONST. | 0.0000E+00 | 0.0000E+00 | 0.0000E+00 |

TABLE 11-continued

Free-form surface (FFS) shape

| | | | |
|---|---|---|---|
| X | 0.0000E+00 | 0.0000E+00 | 0.0000E+00 |
| Y | 0.0000E+00 | 0.0000E+00 | 0.0000E+00 |
| X**2 | −9.8569E−03 | −5.8939E−03 | −7.6935E−04 |
| X * Y | 0.0000E+00 | 0.0000E+00 | 0.0000E+00 |
| Y**2 | −4.5919E−03 | −1.3863E−02 | −3.0660E−03 |
| X**3 | 0.0000E+00 | 0.0000E+00 | 0.0000E+00 |
| X**2 * Y | 2.1387E−04 | −9.9693E−04 | −8.7147E−04 |
| X Y**2 | 0.0000E+00 | 0.0000E+00 | 0.0000E+00 |
| Y**3 | 2.0417E−04 | 1.3063E−04 | 1.2088E−03 |
| X**4 | −6.9069E−06 | 9.0172E−05 | 1.3722E−04 |
| X**3 * Y | 0.0000E+00 | 0.0000E+00 | 0.0000E+00 |
| X**2 * Y**2 | −5.4022E−05 | −1.1676E−04 | 1.0989E−04 |
| X * Y**3 | 0.0000E+00 | 0.0000E+00 | 0.0000E+00 |
| Y**4 | −1.2158E−05 | −2.2299E−05 | −1.4668E−05 |
| X**5 | 0.0000E+00 | 0.0000E+00 | 0.0000E+00 |
| X**4 * Y | −1.0934E−06 | 8.1899E−07 | 7.9340E−06 |
| X**3 * Y**2 | 0.0000E+00 | 0.0000E+00 | 0.0000E+00 |
| X**2 * Y**3 | −1.0282E−06 | −1.5047E−07 | −1.6871E−05 |
| X * Y**4 | 0.0000E+00 | 0.0000E+00 | 0.0000E+00 |
| Y**5 | 3.1731E−07 | −5.7000E−07 | −5.3054E−05 |
| X**6 | 7.7224E−08 | 1.2112E−08 | −2.6215E−06 |
| X**5 * Y | 0.0000E+00 | 0.0000E+00 | 0.0000E+00 |
| X**4 * Y**2 | −1.0416E−07 | 1.2772E−07 | −2.2403E−06 |
| X**3 * Y**3 | 0.0000E+00 | 0.0000E+00 | 0.0000E+00 |
| X**2 * Y**4 | 9.7467E−08 | −5.4180E−08 | −1.3075E−06 |
| X * Y**5 | 0.0000E+00 | 0.0000E+00 | 0.0000E+00 |
| Y**6 | 1.3412E−08 | 2.8289E−08 | 3.6745E−06 |
| X**7 | 0.0000E+00 | 0.0000E+00 | 0.0000E+00 |
| X**6 * Y | −8.3529E−09 | 1.5822E−08 | −3.3455E−07 |
| X**5 * Y**2 | 0.0000E+00 | 0.0000E+00 | 0.0000E+00 |
| X**4 * Y**3 | −3.2469E−08 | −2.6999E−08 | 1.0753E−07 |
| X**3 * Y**4 | 0.0000E+00 | 0.0000E+00 | 0.0000E+00 |
| X**2 * Y**5 | −3.2451E−10 | 1.6082E−08 | −2.1370E−06 |
| X * Y**6 | 0.0000E+00 | 0.0000E+00 | 0.0000E+00 |
| Y**7 | −1.1674E−09 | −5.8004E−11 | 3.5790E−06 |
| X**8 | −2.1359E−09 | −6.4105E−11 | 4.9160E−08 |
| X**7 * Y | 0.0000E+00 | 0.0000E+00 | 0.0000E+00 |
| X**6 * Y**2 | 6.6735E−10 | −9.3155E−10 | 1.4608E−07 |
| X**5 * Y**3 | 0.0000E+00 | 0.0000E+00 | 0.0000E+00 |
| X**4 * Y**4 | −7.5413E−10 | 5.8419E−10 | 1.5787E−07 |
| X**3 * Y**5 | 0.0000E+00 | 0.0000E+00 | 0.0000E+00 |
| X**2 * Y**6 | −8.6805E−11 | −2.0537E−09 | −1.1679E−07 |
| X * Y**7 | 0.0000E+00 | 0.0000E+00 | 0.0000E+00 |
| Y**8 | 8.3085E−11 | −8.3547E−11 | 6.1289E−07 |
| X**9 | 0.0000E+00 | 0.0000E+00 | 0.0000E+00 |
| X**8 * Y | 4.5529E−11 | 2.1522E−10 | 4.9906E−09 |
| X**7 * Y**2 | 0.0000E+00 | 0.0000E+00 | 0.0000E+00 |
| X**6 * Y**3 | 5.6993E−10 | −1.4204E−10 | 1.6507E−10 |
| X**5 * Y**4 | 0.0000E+00 | 0.0000E+00 | 0.0000E+00 |
| X**4 * Y**5 | 1.9949E−10 | 3.9480E−10 | 3.9747E−08 |
| X**3 * Y**6 | 0.0000E+00 | 0.0000E+00 | 0.0000E+00 |
| X**2 * Y**7 | 1.8005E−11 | 2.0986E−10 | 1.1914E−07 |
| X * Y**8 | 0.0000E+00 | 0.0000E+00 | 0.0000E+00 |
| Y**9 | 8.5447E−12 | 2.7615E−11 | 7.0468E−09 |
| X**10 | 1.2480E−11 | −1.0892E−11 | −2.3622E−10 |
| X**9 * Y | 0.0000E+00 | 0.0000E+00 | 0.0000E+00 |
| X**8 * Y**2 | 1.2123E−11 | −4.1006E−11 | −1.3804E−09 |
| X**7 * Y**3 | 0.0000E+00 | 0.0000E+00 | 0.0000E+00 |
| X**6 * Y**4 | 3.4647E−11 | 1.0606E−11 | −2.7567E−09 |
| X**5 * Y**5 | 0.0000E+00 | 0.0000E+00 | 0.0000E+00 |
| X**4 * Y**6 | 5.7723E−12 | −1.1523E−10 | 6.2419E−09 |
| X**3 * Y**7 | 0.0000E+00 | 0.0000E+00 | 0.0000E+00 |
| X**2 * Y**8 | 4.0365E−13 | −1.3529E−11 | 1.2106E−08 |
| X * Y**9 | 0.0000E+00 | 0.0000E+00 | 0.0000E+00 |
| Y**10 | 4.1988E−14 | −4.7376E−12 | −4.5881E−09 |

| SURFACE NO. | 15 | 16 | 17 |
|---|---|---|---|
| Y RAD. OF CURV. | 24.983 | 1519.213 | 21.846 |
| CONIC CONST. | −5.9097E−01 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | −1.1501E−02 | 2.9996E−04 | −8.9452E−03 |
| X * Y | 0.0000E+00 | 0.0000E+00 | 0.0000E+00 |
| Y**2 | −4.2118E−02 | −1.2990E−04 | 5.2574E−03 |
| X**3 | 0.0000E+00 | 0.0000E+00 | 0.0000E+00 |
| X**2 * Y | 2.7320E−04 | 4.5103E−06 | 3.2038E−04 |
| X Y**2 | 0.0000E+00 | 0.0000E+00 | 0.0000E+00 |
| Y**3 | 1.2022E−03 | 1.6014E−07 | 7.3028E−04 |
| X**4 | −2.3434E−05 | −2.5299E−07 | 1.0301E−05 |
| X**3 * Y | 0.0000E+00 | 0.0000E+00 | 0.0000E+00 |
| X**2 * Y**2 | −2.7715E−06 | 5.7076E−08 | 2.0908E−05 |
| X * Y**3 | 0.0000E+00 | 0.0000E+00 | 0.0000E+00 |
| Y**4 | −4.6472E−05 | 5.6311E−09 | −7.9317E−06 |
| X**5 | 0.0000E+00 | 0.0000E+00 | 0.0000E+00 |
| X**4 * Y | 5.6118E−07 | −2.9059E−09 | −4.2231E−07 |
| X**3 * Y**2 | 0.0000E+00 | 0.0000E+00 | 0.0000E+00 |
| X**2 * Y**3 | 4.3914E−07 | 7.5388E−10 | −3.2760E−06 |
| X * Y**4 | 0.0000E+00 | 0.0000E+00 | 0.0000E+00 |
| Y**5 | 7.5868E−07 | 1.0190E−10 | −4.1124E−06 |
| X**6 | −8.2116E−08 | −1.4470E−09 | −3.0198E−08 |
| X**5 * Y | 0.0000E+00 | 0.0000E+00 | 0.0000E+00 |
| X**4 * Y**2 | −2.7247E−09 | −3.8903E−11 | −5.6616E−08 |
| X**3 * Y**3 | 0.0000E+00 | 0.0000E+00 | 0.0000E+00 |
| X**2 * Y**4 | 1.0701E−08 | 7.8086E−12 | 3.8337E−08 |
| X * Y**5 | 0.0000E+00 | 0.0000E+00 | 0.0000E+00 |
| Y**6 | 6.6657E−10 | 1.2568E−12 | 1.0851E−06 |
| X**7 | 0.0000E+00 | 0.0000E+00 | 0.0000E+00 |
| X**6 * Y | −6.9684E−09 | −4.7661E−11 | −1.3969E−10 |
| X**5 * Y**2 | 0.0000E+00 | 0.0000E+00 | 0.0000E+00 |
| X**4 * Y**3 | −3.3391E−10 | −2.9706E−13 | 1.7224E−08 |
| X**3 * Y**4 | 0.0000E+00 | 0.0000E+00 | 0.0000E+00 |
| X**2 * Y**5 | 1.4605E−10 | 4.0031E−14 | 7.0880E−08 |
| X * Y**6 | 0.0000E+00 | 0.0000E+00 | 0.0000E+00 |
| Y**7 | −1.5518E−10 | 1.2020E−14 | 2.1898E−08 |
| X**8 | 4.0724E−09 | 9.4222E−12 | 3.0032E−11 |
| X**7 * Y | 0.0000E+00 | 0.0000E+00 | 0.0000E+00 |
| X**6 * Y**2 | −9.0419E−11 | 3.9729E−13 | 1.3097E−10 |
| X**5 * Y**3 | 0.0000E+00 | 0.0000E+00 | 0.0000E+00 |
| X**4 * Y**4 | −1.1214E−11 | −1.7745E−14 | 1.3780E−09 |
| X**3 * Y**5 | 0.0000E+00 | 0.0000E+00 | 0.0000E+00 |
| X**2 * Y**6 | 3.2685E−12 | 4.3640E−16 | −8.5566E−10 |
| X * Y**7 | 0.0000E+00 | 0.0000E+00 | 0.0000E+00 |
| Y**8 | −1.4740E−12 | −8.2874E−17 | −8.2746E−09 |
| X**9 | 0.0000E+00 | 0.0000E+00 | 0.0000E+00 |
| X**8 * Y | −8.2920E−11 | 5.8125E−14 | 3.4344E−12 |
| X**7 * Y**2 | 0.0000E+00 | 0.0000E+00 | 0.0000E+00 |
| X**6 * Y**3 | 1.1340E−11 | 2.1175E−15 | −1.5743E−11 |
| X**5 * Y**4 | 0.0000E+00 | 0.0000E+00 | 0.0000E+00 |
| X**4 * Y**5 | −5.4814E−13 | 1.0029E−16 | −1.3209E−11 |
| X**3 * Y**6 | 0.0000E+00 | 0.0000E+00 | 0.0000E+00 |
| X**2 * Y**7 | 7.0241E−15 | 3.8595E−17 | −3.7367E−10 |
| X * Y**8 | 0.0000E+00 | 0.0000E+00 | 0.0000E+00 |
| Y**9 | 2.3218E−14 | −6.4330E−18 | −1.5670E−10 |
| X**10 | 1.3008E−11 | −3.2988E−14 | 0.0000E+00 |
| X**9 * Y | 0.0000E+00 | 0.0000E+00 | 0.0000E+00 |
| X**8 * Y**2 | −8.2002E−12 | 3.1901E−15 | 0.0000E+00 |
| X**7 * Y**3 | 0.0000E+00 | 0.0000E+00 | 0.0000E+00 |
| X**6 * Y**4 | 1.3387E−12 | −1.5553E−16 | 0.0000E+00 |
| X**5 * Y**5 | 0.0000E+00 | 0.0000E+00 | 0.0000E+00 |
| X**4 * Y**6 | −1.8850E−13 | −2.9247E−17 | 0.0000E+00 |
| X**3 * Y**7 | 0.0000E+00 | 0.0000E+00 | 0.0000E+00 |
| X**2 * Y**8 | 8.3387E−16 | −4.6729E−18 | 0.0000E+00 |
| X * Y**9 | 0.0000E+00 | 0.0000E+00 | 0.0000E+00 |
| Y**10 | 8.2647E−16 | −2.8684E−19 | 0.0000E+00 |

Tables 12 to 15 below show the corresponding values of the respective conditional expressions (1) to (4) in the respective numerical examples 1 to 4.

TABLE 12

EXAMPLE 1
IMAGE SIZE: 125", PRISM Nd = 1.540, vd = 59.46
SIZE OF IMAGE FORMING ELEMENT: X = 14.516, Y = 9.072
X, Y: RELATIVE COORDINATE ON IMAGE FORMING ELEMENT
RA: |OPLY| − |OPLX|, RB: Σ(|OPLY| − |OPLX|)
RC: |2 × (MMX − MMY)/(MMX + MMY)|

| X = 0.000 | (1) | (2) | | (3) | | | (4) | | |
|---|---|---|---|---|---|---|---|---|---|
| Y | |M| | |MX| | |MY| | |OPLX| | |OPLY| | RA | |MMX| | |MMY| | RC |
| 0.000 | 3.06 | 3.06 | 2.84 | 8.84 | 10.86 | 2.02 | 186.61 | 186.53 | 0.00 |
| 0.125 | 2.91 | 2.91 | 2.60 | 9.37 | 12.79 | 3.42 | 188.71 | 184.49 | 0.02 |
| 0.250 | 2.73 | 2.73 | 2.28 | 9.98 | 15.06 | 5.08 | 188.05 | 185.86 | 0.01 |
| 0.375 | 2.54 | 2.54 | 1.97 | 10.63 | 17.03 | 6.39 | 186.81 | 186.36 | 0.00 |
| 0.500 | 2.36 | 2.36 | 1.69 | 11.29 | 18.50 | 7.21 | 185.88 | 187.03 | 0.01 |
| 0.625 | 2.20 | 2.20 | 1.43 | 11.93 | 19.47 | 7.54 | 185.46 | 187.77 | 0.01 |
| 0.750 | 2.05 | 2.05 | 1.21 | 12.53 | 19.99 | 7.45 | 185.38 | 188.11 | 0.01 |
| 0.875 | 1.92 | 1.92 | 1.02 | 13.10 | 20.15 | 7.05 | 185.46 | 188.15 | 0.01 |
| 1.000 | 1.79 | 1.79 | 0.87 | 13.59 | 20.08 | 6.49 | 185.60 | 188.38 | 0.01 |
| | | | | | RB | 15.71 | | | |

TABLE 13

EXAMPLE 2
IMAGE SIZE: 80", PRISM Nd = 1.530, vd = 55.84
SIZE OF IMAGE FORMING ELEMENT: X = 10.588, Y = 5.956
X, Y: RELATIVE COORDINATE ON IMAGE FORMING ELEMENT
RA: |OPLY| − |OPLX|, RB: Σ(|OPLY1 − |OPLX|)
RC: |2 × (MMX − MMY)/(MMX + MMY)|

| X = 0.000 | (1) | (2) | | (3) | | | (4) | | |
|---|---|---|---|---|---|---|---|---|---|
| Y | |M| | |MX| | |MY| | |OPLX| | |OPLY| | RA | |MMX| | |MMY| | RC |
| 0.000 | 2.81 | 2.81 | 2.65 | 5.73 | 9.34 | 3.60 | 166.70 | 166.53 | 0.00 |
| 0.125 | 2.72 | 2.72 | 2.41 | 6.07 | 11.98 | 5.91 | 166.88 | 165.33 | 0.01 |
| 0.250 | 2.63 | 2.63 | 2.13 | 6.51 | 14.36 | 7.85 | 166.67 | 165.13 | 0.01 |
| 0.375 | 2.53 | 2.53 | 1.82 | 7.03 | 14.98 | 7.95 | 166.60 | 166.17 | 0.00 |
| 0.500 | 2.42 | 2.42 | 1.51 | 7.61 | 15.34 | 7.73 | 166.75 | 167.75 | 0.01 |
| 0.625 | 2.31 | 2.31 | 1.24 | 8.21 | 15.46 | 7.25 | 167.06 | 169.21 | 0.01 |
| 0.750 | 2.19 | 2.19 | 1.01 | 8.74 | 15.45 | 6.71 | 167.40 | 169.74 | 0.01 |
| 0.875 | 2.07 | 2.07 | 0.83 | 9.17 | 15.36 | 6.19 | 167.65 | 168.87 | 0.01 |
| 1.000 | 1.95 | 1.95 | 0.68 | 9.49 | 15.17 | 5.68 | 167.72 | 167.12 | 0.00 |
| | | | | | RB | 17.01 | | | |

TABLE 14

EXAMPLE 3
IMAGE SIZE: 125", PRISM Nd = 1.540, vd = 59.46
SIZE OF IMAGE FORMING ELEMENT: X = 14.516, Y = 9.072
X, Y: RELATIVE COORDINATE ON IMAGE FORMING ELEMENT
RA: |OPLY| − |OPLX|, RB: Σ(|OPLY| − |OPLX|)
RC: |2 × (MMX − MMY)/(MMX + MMY)|

| X = 0.000 | (1) | (2) | | (3) | | | (4) | | |
|---|---|---|---|---|---|---|---|---|---|
| Y | |M| | |MX| | |MY| | |OPLX| | |OPLY| | RA | |MMX| | |MMY| | RC |
| 0.000 | 3.01 | 3.01 | 2.80 | 8.92 | 10.83 | 1.91 | 186.57 | 186.58 | 0.00 |
| 0.125 | 2.87 | 2.87 | 2.57 | 9.45 | 12.70 | 3.25 | 188.75 | 184.42 | 0.02 |
| 0.250 | 2.69 | 2.69 | 2.26 | 10.05 | 14.90 | 4.85 | 188.13 | 185.83 | 0.01 |
| 0.375 | 2.51 | 2.51 | 1.96 | 10.69 | 16.83 | 6.13 | 186.96 | 186.72 | 0.00 |
| 0.500 | 2.34 | 2.34 | 1.68 | 11.34 | 18.28 | 6.94 | 186.12 | 187.66 | 0.01 |
| 0.625 | 2.18 | 2.18 | 1.43 | 11.97 | 19.24 | 7.28 | 185.77 | 188.53 | 0.01 |

TABLE 14-continued

EXAMPLE 3
IMAGE SIZE: 125", PRISM Nd = 1.540, vd = 59.46
SIZE OF IMAGE FORMING ELEMENT: X = 14.516, Y = 9.072
X, Y: RELATIVE COORDINATE ON IMAGE FORMING
ELEMENT
RA: |OPLY| − |OPLX|, RB: Σ(|OPLY| − |OPLX|)
RC: |2 × (MMX − MMY)/(MMX + MMY)|

| X = 0.000 | (1) | (2) | | (3) | | | (4) | | |
|---|---|---|---|---|---|---|---|---|---|
| Y | |M| | |MX| | |MY| | |OPLX| | |OPLY| | RA | |MMX| | |MMY| | RC |
| 0.750 | 2.04 | 2.04 | 1.21 | 12.56 | 19.76 | 7.20 | 185.75 | 188.87 | 0.02 |
| 0.875 | 1.91 | 1.91 | 1.02 | 13.11 | 19.94 | 6.83 | 185.87 | 188.74 | 0.02 |
| 1.000 | 1.79 | 1.79 | 0.87 | 13.58 | 19.87 | 6.29 | 186.01 | 188.66 | 0.01 |
| | | | | RB | | 15.14 | | | |

TABLE 15

EXAMPLE 4
IMAGE SIZE: 50", PRISM Nd = 1.6074, vd = 27
SIZE OF IMAGE FORMING ELEMENT: X = 6.912, Y = 3.880
X, Y: RELATIVE COORDINATE ON IMAGE FORMING
ELEMENT
RA: |OPLY| − |OPLX|, RB: Σ(|OPLY| − |OPLX|)
RC: |2 × (MMX − MMY)/(MMX + MMY)|

| X = 0.000 | (1) | (2) | | (3) | | | (4) | | |
|---|---|---|---|---|---|---|---|---|---|
| Y | |M| | |MX| | |MY| | |OPLX| | |OPLY| | RA | |MMX| | |MMY| | RC |
| 0.000 | 2.59 | 2.32 | 2.59 | 4.42 | 3.49 | −0.93 | 165.99 | 165.93 | 0.00 |
| 0.125 | 2.37 | 2.25 | 2.37 | 4.94 | 5.23 | 0.29 | 166.40 | 174.63 | 0.05 |
| 0.250 | 2.17 | 2.17 | 2.14 | 5.36 | 7.02 | 1.66 | 168.67 | 169.44 | 0.00 |
| 0.375 | 2.08 | 2.08 | 1.92 | 5.76 | 8.61 | 2.85 | 168.53 | 160.86 | 0.05 |
| 0.500 | 1.99 | 1.99 | 1.73 | 6.19 | 9.88 | 3.68 | 167.76 | 159.10 | 0.05 |
| 0.625 | 1.91 | 1.91 | 1.56 | 6.65 | 10.91 | 4.26 | 167.26 | 161.81 | 0.03 |
| 0.750 | 1.82 | 1.82 | 1.41 | 7.12 | 11.72 | 4.61 | 167.13 | 166.72 | 0.00 |
| 0.875 | 1.73 | 1.73 | 1.25 | 7.59 | 12.25 | 4.66 | 167.14 | 171.49 | 0.03 |
| 1.000 | 1.64 | 1.64 | 1.09 | 8.10 | 12.44 | 4.33 | 167.19 | 174.14 | 0.04 |
| | | | | RB | | 7.09 | | | |

Table 16 below shows the corresponding values of the conditional expression (5) in the respective numerical examples 1 to 4.

TABLE 16

AR: ANGLE OF PRINCIPAL RAY ON REDUCTION SIDE
AM: ANGLE OF PRINCIPAL RAY ON MAGNIFICATION SIDE

| (5) | | EXAMPLE 1 | | EXAMPLE 2 | | EXAMPLE 3 | | EXAMPLE 4 | |
|---|---|---|---|---|---|---|---|---|---|
| | | |MAX| | |MIN| | |MAX| | |MIN| | |MAX| | |MIN| | |MAX| | |MIN| |
| FIRST | AR | 36.64 | 0.50 | 32.90 | 0.28 | 36.03 | 0.55 | 33.67 | 1.57 |
| SURF. | AM | 22.77 | 0.33 | 20.76 | 0.18 | 22.42 | 0.36 | 21.22 | 1.03 |
| SECOND | AR | 30.99 | 9.29 | 36.15 | 25.37 | 30.81 | 8.72 | 36.13 | 12.59 |
| SURF. | AM | 30.99 | 9.29 | 36.15 | 25.37 | 30.81 | 8.72 | 36.13 | 12.59 |
| THIRD | AR | 67.67 | 20.41 | 62.18 | 5.09 | | | 62.10 | 15.12 |
| SURF. | AM | 67.67 | 20.41 | 62.18 | 5.09 | | | 62.10 | 15.12 |
| FOURTH | AR | 16.80 | 2.99 | 7.42 | 0.62 | 17.09 | 2.89 | 13.99 | 0.43 |
| SURF. (B) | AM | 26.46 | 4.61 | 11.42 | 0.96 | 26.95 | 4.46 | 21.74 | 0.66 |

Second Embodiment

Figure 21:
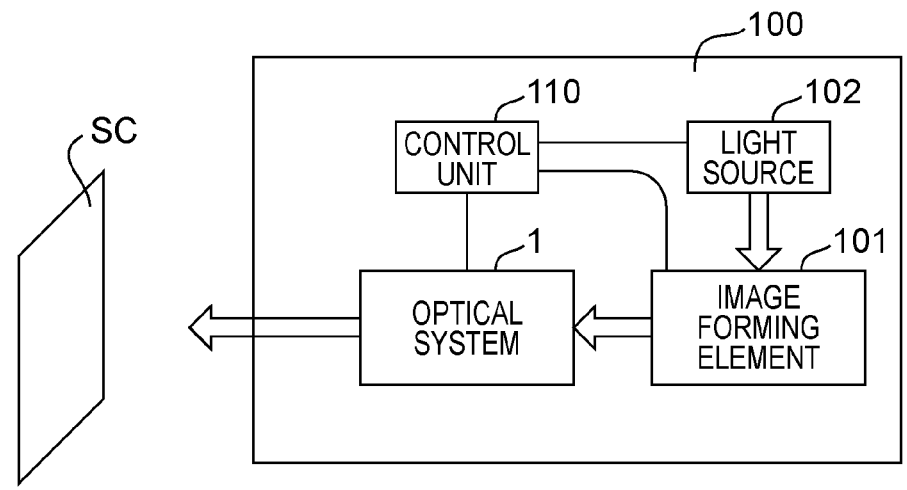
FIG. 21 is a block diagram showing an example of an image projection apparatus according to the present disclosure.

Hereinafter, a second embodiment of the present disclosure is described with reference to FIG. 21. FIG. 21 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SC. The light source 102 is constituted of, for example, light emitting diode (LED) or laser, for supplying light to the image forming element 101. The control unit 110 is constituted of, for example, central processing unit (CPU) or micro-processing unit (MPU), for controlling the entire apparatus and respective components. The optical system 1 may be configured as either an interchangeable lens that can be detachably attached to the image projection apparatus 100 or a built-in lens that is integrated in the image projection apparatus 100.

The image projection apparatus 100 described above can become larger-sized and realize projection with a shorter focal length and a larger-sized screen.

Third Embodiment

Figure 22:
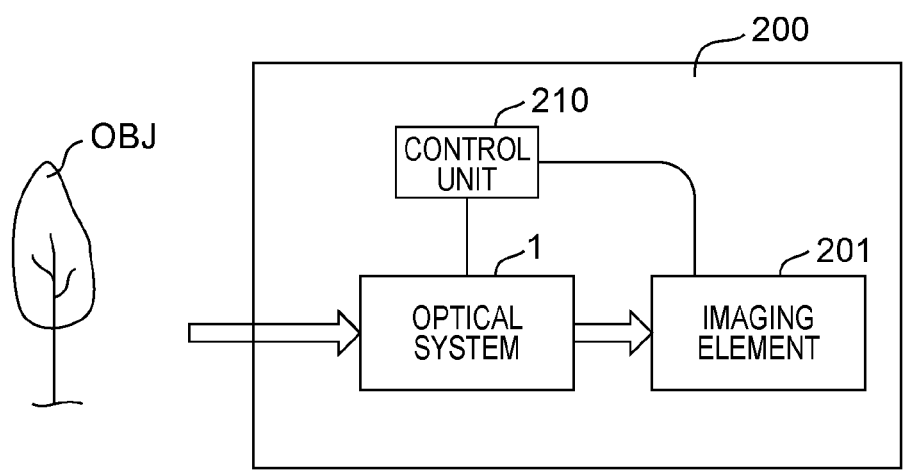
FIG. 22 is a block diagram showing an example of an imaging apparatus according to the present disclosure.

Hereinafter, a third embodiment of the present disclosure is described with reference to FIG. 22. FIG. 22 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as either an interchangeable lens that can be detachably attached to the imaging apparatus 200 or a built-in lens that is integrated in the imaging apparatus 200.

The imaging apparatus 200 described above can become larger-sized and realize imaging with a shorter focal length and a larger-sized screen.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system having a reduction conjugation point on a reduction side and a magnification conjugation point on a magnification side and internally having an intermediate imaging position that is conjugated to both the reduction conjugation point and the magnification conjugation point,
    wherein the reduction conjugate point has an image-forming relationship in a rectangular region having a longitudinal direction and a lateral direction,
    wherein the optical system includes a first sub-optical system including an aperture stop defining a range in which a light flux can pass through the optical system and a second sub-optical system disposed on the magnification side of the first sub-optical system and including a prism made of a transparent medium,
    wherein the prism has a first transmission surface located on the reduction side, a second transmission surface located on the magnification side, and at least one reflection surface located on an optical path between the first transmission surface and the second transmission surface,
    wherein the aperture stop is positioned between the reduction conjugate point and the intermediate imaging position,
    wherein a first reflection surface closest to the first transmission surface on the optical path in the prism has a shape with a concave surface facing a direction into which a light ray incident on the first reflection surface is reflected,
    wherein the second transmission surface has a shape with a convex surface facing the magnification side,
    wherein the intermediate imaging position is positioned away from the first reflection surface only toward the reduction side of the first reflection surface,
    wherein a portion or whole of intermediate images formed at the intermediate imaging position are positioned inside the medium of the prism,
    wherein in case an X-direction, a Y-direction, and a Z-direction are a longitudinal direction, a lateral direction, and a normal direction, respectively, of the rectangular region of the reduction conjugate point, when a Y cross-section is a plane including a position where a principal ray passing through the center in the X-direction is reflected by the first reflection surface, and an X cross-section is a cross-section perpendicular to the Y cross-section, a curvature shape of the first reflection surface is set such that some of multiple principal rays passing through the reduction conjugate point intersect on the optical path between the first reflection surface and the second transmission surface as viewed in a direction perpendicular to the Y cross-section while some of multiple principal rays passing through the reduction conjugate point intersect on the optical path between the first reflection surface and the second transmission surface as viewed in a direction perpendicular to the X cross-section, and wherein the light flux passing through the first sub-optical system forms both the intermediate image in the Y-direction parallel to the Y cross-section and the intermediate image in the X-direction parallel to the X cross-section at positions different to each other, the intermediate image in the Y-direction being defined as the light flux passing through the first sub-optical system being focused only in the Y-direction and not focused in the X-direction, the intermediate image in the Y-direction being defined as the light flux passing through the first sub-optical system being focused only in the X-direction and not focused in the Y-direction.

2. The optical system according to claim 1, wherein the first reflection surface has a shape with a concave surface facing an reduction optical path side along the intermediate imaging position in the X-direction parallel to the X cross-section of the light ray passing through the center in the longitudinal direction of the rectangular region.

3. The optical system according to claim 2, satisfying the following condition (1a) or condition (1b):

$$0<|MX|<10 \quad (1a)$$

$$0<|MY|<10 \quad (1b)$$

where MX is an imaging magnification ratio at the intermediate imaging position in the X-direction parallel to the X cross-section with respect to the reduction conjugate point, and MY is an imaging magnification ratio at the intermediate imaging position in the Y-direction parallel to the Y cross-section with respect to the reduction conjugate point.

4. The optical system according to claim 3, satisfying the following condition (2):

$$|MX|>|MY| \quad (2).$$

5. The optical system according to claim 1, wherein the intermediate imaging position in the X-direction exists between the intermediate imaging position in the Y-direction and the first reflection surface.

6. The optical system according to claim 2, satisfying the following condition (3):

$$\Sigma(|OPLY|-|OPLX|)>0 \quad (3)$$

where OPLX is an optical path length between the intermediate imaging position in the X-direction and the reflection surface, and OPLY is an optical path length between the intermediate imaging position in the Y-direction and the reflection surface, and $\Sigma(|OPLY|-|OPLX|)$ is a total value obtained by adding the difference between the absolute value of the optical path length OPLX and the absolute value of the optical path length OPLY for three principal rays passing through the normalized heights Y=0.0, 0.5, 1.0 at the reduction conjugate point.

7. The optical system according to claim 1, satisfying the following condition (4):

$$|2\times(MMX-MMY)/(MMX+MMY)|<0.30 \quad (4)$$

where MMX is an X-direction imaging magnification ratio at the magnification conjugate point with respect to the reduction conjugate point, and MMY is a Y-direction imaging magnification ratio at the magnification conjugate point with respect to the reduction conjugate point.

8. The optical system according to claim 1, satisfying the following condition (5):

$$|\theta i|<50 \quad (5)$$

where $\theta i$ is an incident angle (unit: degrees) relative to the normal of the second transmission surface at a position where a principal ray is incident on the second transmission surface when the principal ray passes through the second transmission surface of the medium.

9. The optical system according to claim 1, wherein the second transmission surface has the maximum effective area among the first transmission surface, the second transmission surface, and the at least one reflection surface.

10. The optical system according to claim 1, wherein the aperture stop is positioned between the reduction conjugate point and the first transmission surface.

11. The optical system according to claim 1, wherein all of the multiple principal rays passing through the reduction conjugate point intersect on the optical path between the first reflection surface and the second transmission surface.

12. The optical system according to claim 1, wherein either an entrance pupil or an exit pupil corresponding to the aperture stop is positioned in the prism.

13. The optical system according to claim 1, wherein the first reflection surface has a free-form surface allowing some of the multiple principal rays passing through the reduction conjugate point to intersect on the optical path between the first reflection surface and the second transmission surface.

14. The optical system according to claim 1, wherein the optical system has a stepped structure formed on an outer circumferential portion of the prism.

15. The optical system according to claim 1, wherein the optical system is an imaging optical system.

16. The optical system according to claim 1, wherein the first transmission surface, the second transmission surface, and the first reflection surface have free-form surface shapes satisfying the following condition:

$$z = \frac{cr^2}{1+\sqrt{1-(1+k)c^2r^2}} + \sum_{j=2}^{137} C_j x^m y^n$$

$$j = \frac{(m+n)^2 + m + 3n}{2} + 1$$

where Z is a sag height of a surface as measured in parallel to z-axis, r is a distance in the radial direction ($=\sqrt{(x^2+y^2)}$), c is a vertex curvature, k is a conic constant, and $C_j$ is a coefficient of a monomial $X^m y^n$.

17. The optical system according to claim 1, wherein an image region defined as the rectangular region at the reduction conjugate point has an image-forming relationship that is optically conjugated to an image region at the magnification conjugate point.

18. An image projection apparatus comprising:
the optical system according to claim 1; and
an image forming element that generates an image to be projected through the optical system onto a screen.

19. An imaging apparatus comprising:
the optical system according to claim 1; and
an imaging element that receives an optical image formed by the optical system to convert the optical image into an electrical image signal.

20. An optical system having a reduction conjugation point on a reduction side and a magnification conjugation point on a magnification side and internally having an intermediate imaging position that is conjugated to both the reduction conjugation point and the magnification conjugation point,
- wherein the reduction conjugate point has an image-forming relationship in a rectangular region having a longitudinal direction and a lateral direction,
- wherein the optical system includes a first sub-optical system including an aperture stop defining a range in which a light flux can pass through the optical system and a second sub- optical system disposed on the magnification side of the first sub-optical system and including a prism made of a transparent medium,
- wherein the prism has a first transmission surface located on the reduction side, a second transmission surface located on the magnification side, and at least one reflection surface located on an optical path between the first transmission surface and the second transmission surface,
- wherein the aperture stop is positioned between the reduction conjugate point and the intermediate imaging position,
- wherein a first reflection surface closest to the first transmission surface on the optical path in the prism has a shape with a concave surface facing a direction into which a light ray incident on the first reflection surface is reflected,
- wherein the second transmission surface has a shape with a convex surface facing the magnification side,
- wherein the intermediate imaging position is positioned away from the first reflection surface only toward the reduction side of the first reflection surface,
- wherein a portion or whole of intermediate images formed at the intermediate imaging position are positioned inside the medium of the prism,
- wherein in case an X-direction, a Y-direction, and a Z-direction are a longitudinal direction, a lateral direction, and a normal direction, respectively, of the rectangular region of the reduction conjugate point, when a Y cross-section is a plane including a position where a principal ray passing through the center in the X-direction is reflected by the first reflection surface, and an X cross-section is a cross-section perpendicular to the Y cross-section, a curvature shape of the first reflection surface is set such that some of multiple principal rays passing through the reduction conjugate point intersect on the optical path between the first reflection surface and the second transmission surface as viewed in a direction perpendicular to the Y cross-section while some of multiple principal rays passing through the reduction conjugate point intersect on the optical path between the first reflection surface and the second transmission surface as viewed in a direction perpendicular to the X cross-section, and
- wherein the optical system satisfies the following condition (4):

$$|2\times(MMX-MMY)/(MMX+MMY)|<0.30 \qquad (4)$$

where MMX is an X-direction imaging magnification ratio at the magnification conjugate point with respect to the reduction conjugate point, and MMY is a Y-direction imaging magnification ratio at the magnification conjugate point with respect to the reduction conjugate point.

\* \* \* \* \*